United States Patent [19]

Morehouse et al.

[11] Patent Number: 4,933,785

[45] Date of Patent: Jun. 12, 1990

[54] DISK DRIVE APPARATUS USING DYNAMIC LOADING/UNLOADING

[75] Inventors: James H. Morehouse, Jamestown; Thomas L. Andrews, Jr., Boulder; John H. Blagaila, Boulder; David M. Furay, Boulder; Terry G. Johnson, Longmont, all of Colo.

[73] Assignee: Prairietek Corporation, Longmont, Colo.

[21] Appl. No.: 162,799

[22] Filed: Mar. 1, 1988

[51] Int. Cl.$^5$ .................. G11B 5/54; G11B 33/02; G11B 17/028

[52] U.S. Cl. .................. 360/78.04; 360/77.02; 360/99.12; 360/105; 360/137

[58] Field of Search ............ 360/69, 77.02, 78.04, 360/78.06, 97.01, 98.01, 98.02, 99.05, 99.12, 105, 137, 106, 75; 318/331, 616, 618, 687

[56] References Cited

U.S. PATENT DOCUMENTS

| | | | |
|---|---|---|---|
| 3,772,666 | 11/1973 | Scholz et al. | 360/75 |
| 3,984,873 | 10/1976 | Pejcha | 360/105 |
| 4,200,827 | 4/1980 | Oswald | 318/616 |
| 4,458,273 | 7/1984 | Johnson | 360/74.1 |
| 4,503,530 | 3/1985 | Hinlein et al. | 360/99.12 |
| 4,535,374 | 8/1985 | Anderson et al. | 360/103 |
| 4,568,988 | 2/1986 | McGinlay et al. | 360/77.02 |
| 4,599,666 | 7/1986 | Liu et al. | 360/97.01 |
| 4,638,383 | 1/1987 | McGinlay et al. | 360/77.02 |
| 4,639,863 | 1/1987 | Harrison et al. | 364/200 |
| 4,672,487 | 6/1987 | Brand et al. | 360/98.02 |
| 4,737,867 | 4/1988 | Ishikawa et al. | 360/69 |
| 4,772,974 | 9/1988 | Moon et al. | |

Primary Examiner—Aristotelis M. Psitos
Assistant Examiner—David L. Robertson
Attorney, Agent, or Firm—Sheridan, Ross & McIntosh

[57] ABSTRACT

A disk drive apparatus is disclosed for primary use with portable, laptop or other information storage systems. The disk drive apparatus includes one or more about 2.5 inch hard disks. A rotary actuator is utilized and includes an arm assembly having a cam follower member for use in dynamically loading/unloading read/write head(s). The cam follower member moves along a ramp, which forms a cam surface, for loading/unloading. The spin motor assembly of the disk drive apparatus includes a rotor having a clamp ring that enables a more powerful spin motor to be incorporated, as well as facilitating and enhancing the connection of the hard disks to the spin motor. The disk drive apparatus also includes servo electronics responsive to a back emf generated signal for use in the servo operation, which use has the potential to increase the servo bandwidth. The accuracy of the servo operation is also enhanced by the use of a flexible circuit that prevents unwanted torque from being applied to the actuator during operation. The disk drive electronics also includes hardware and software for reducing power consumption.

55 Claims, 13 Drawing Sheets

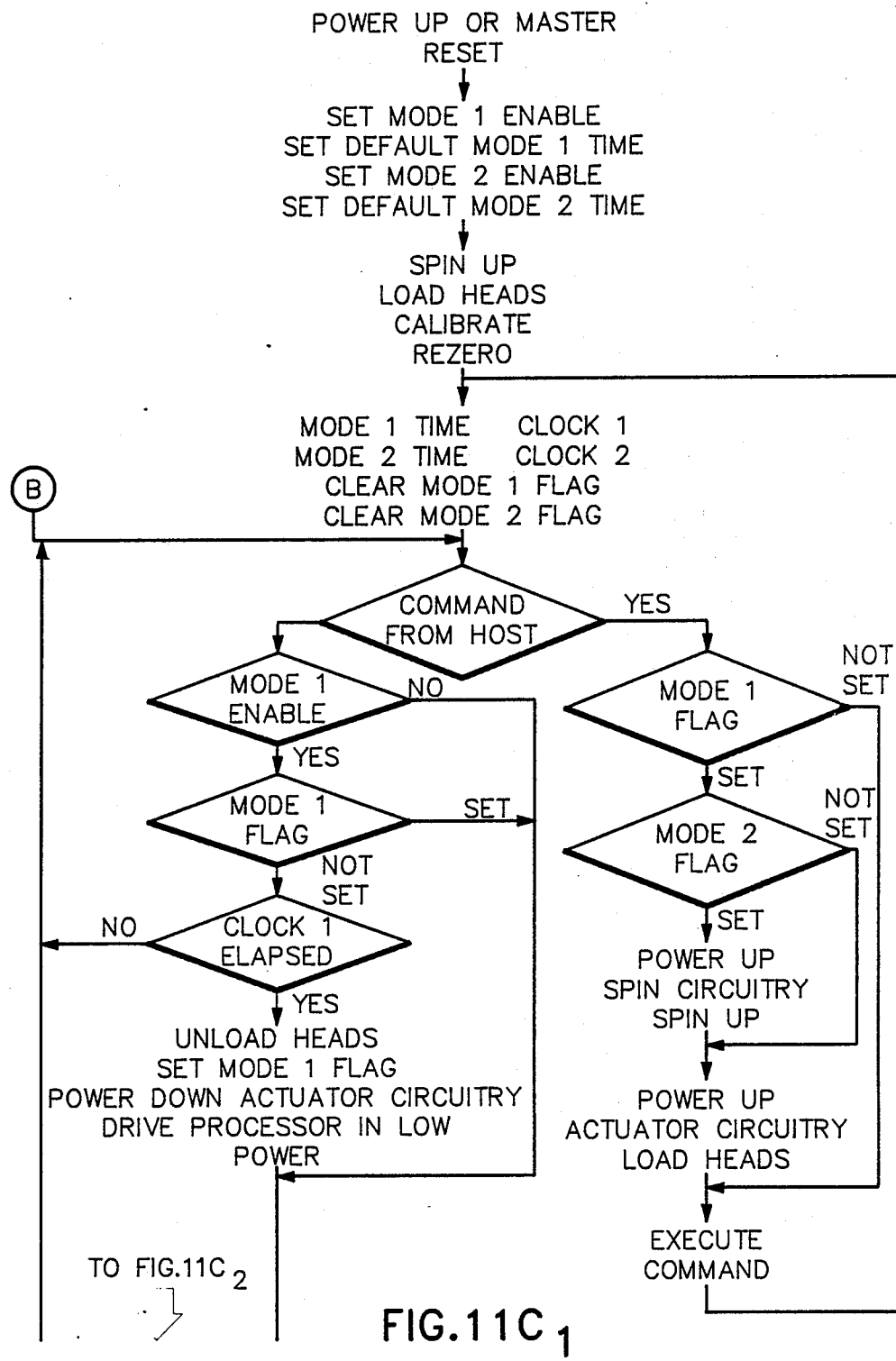

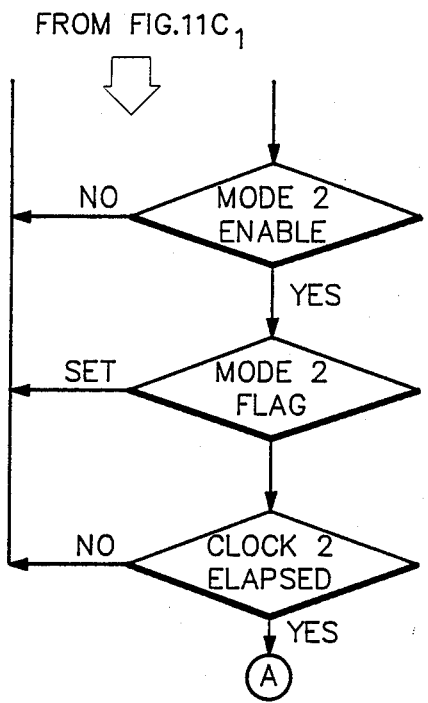
FIG.11C₂

DISK DRIVE APPARATUS USING DYNAMIC LOADING/UNLOADING

FIELD OF THE INVENTION

The present invention relates to a disk drive apparatus including one or more hard disks for primary use with computer systems.

BACKGROUND INFORMATION

The increased demand for even more compact and lightweight computer systems has fostered a need for smaller disk drives and accompanying hard disks for storing data and other information used by such computer systems. A micro-Winchester disk drive is disclosed in U.S. Pat. No. 4,568,988 to McGinlay et al., issued Feb. 4, 1986, and entitled "Microhard-Disk Drive System." This patent describes a disk drive system that utilizes a 3.5 inch hard disk capable of storing in excess of 5 megabytes of information. A rotary actuated read/write head is provided for accessing the disk tracks. The use of an arcuate movable read/write head is important in reducing the space that is required for the containment and operation of the arm assembly to which the read/write head is attached. Although not directed to a micro disk drive system, U.S. Pat. No. 3,984,873 to Pejcha, issued Oct. 5, 1976, and entitled "Head Loading and Unloading Assembly for a Magnetic Disk Drive Having a Rotary Actuator" also describes a rotary actuated read/write head. This rotary configuration is characterized by the use of spring members and a channel member for use in loading and unloading the read/write head relative to the disk surface. Another rotary actuated assembly is described in U.S. Pat. No. 3,772,666 to Scholz et al., issued Nov. 13, 1973, and entitled "Interlaced Magnetic Heads." This patent discloses a pair of interconnected suspension arms with each of the suspension arms having a number of recording heads attached near the free end of each arm. The interconnecting cross member has a semi-hemispherical cam-riding button located at about the mid portion thereof. During operation, the cam-riding button rests in a depression and when in the non-operative state, the button is caused to move away from the depression using an inclined cam surface. In U.S. Pat. No. 4,535,374, to Anderson et al., issued Aug. 13, 1985, and entitled "Whitney-Type Head Loading/Unloading Apparatus," a triangular-shaped suspension arm is utilized having a generally triangular-shaped ramp located on the under side of the suspension arm. This arm assembly is linearly, not rotary, actuated. The ramp member on the suspension arm engages a cam for providing loading/unloading of the read/write head.

In addition to reducing size and weight in connection with laptop computers, it is also important to make available electric power saving features since laptop computers are typically battery-powered and it is desirable to reduce battery drain. In one portable computer system, it is known to reduce power usage by powering down certain of the disk drive electronics upon the occurrence of a single, predetermined event or condition. The aforesaid U.S. Pat. No. 4,568,988 discloses means for reducing current drawn by a stepper motor when the disk drive has been deselected for two seconds. This reduced power consumption is important, not in saving battery life, but for the purpose of reducing the amount of heat needed to be dissipated and thereby reducing the need for air-extraction fans.

A further important aspect associated with disk drive performance concerns the speed at which track seeks are performed, i.e., the amount of time taken to position the read/write head relative to a target position on the disk. In embedded servo systems, the seek time is a function of the ability of the system to access or sample servo information located at predetermined positions on the disk. Provided that there is sufficient time for the servo information to be processed, it is generally desirable to obtain servo information as often as possible without unduly sacrificing disk storage space. The servo information is used to determine the velocity of the arm assembly including the read/write head attached thereto. Using the velocity magnitude, the movement of the arm assembly can be controlled so that the read/write head is accurately positioned relative to the target position on the disk. In conjunction with conducting a high or rapid performance seek, it would be desirable to use the back electromotive force (emf) of the actuator since the back emf is a continuous signal and therefore provides continuous servo information, in contrast to a sampled data servo system commonly found in embedded servo systems. The actuator is utilized in driving or moving the read/write head and the magnitude of the velocity of the arm assembly is a function of the back emf. However, in prior art systems it has not been practical to extract or accurately identify the back emf generated signal in the presence of the significantly greater-in-amplitude servo correction signal being applied to the actuator.

Another factor influencing the accuracy of servo operation, when a rotary actuator is used, relates to the use of a flexible circuit that interconnects the read/write head(s), servo lines, an electrical ground line and the actuator coil with circuit leads for providing communication with processing or servo-related electronics. Prior art flexible circuits exert a torque on the rotary-actuated arm assembly influencing its movement relative to the disk surface or its position relative to the disk track centerline. In order to properly perform track seeking or track following, the effect of such a torque on the arm assembly must be taken into account and compensated for to eliminate track seeking and following errors. Such compensation is generally handled by compensating circuitry or servo software and the need to perform the compensating steps can add to the seek time, as well as increase the cost of the servo mechanism and decrease the accuracy and reliability of the servo control.

To provide a disk drive apparatus for use with a computer system therefore, a number of different factors affecting the design must be addressed. With regard to the present invention, which employs one or more approximately 2.5 inch (within a size range of about ±10%) hard disks, various unique features have been devised in order to implement the about 2.5 inch hard disk concept. These features have resulted in a high performance about 2.5 inch disk drive apparatus, which is characterized by its ruggedness, compact size, reduced weight, rapid and accurate track seeking and power saving modes.

SUMMARY OF THE INVENTION

The present invention discloses a disk drive apparatus particularly suited for use with portable or laptop computers but which can be used with other systems. The disk drive apparatus is characterized by the use of one or more about 2.5 inch hard disks, which are smaller than previously available 3.5 inch hard disks. In conjunction with the use of the about 2.5 inch disk, the "footprint" of the disk drive apparatus has been reduced significantly. Specifically, a disk drive apparatus capable of storing about 5-10 megabytes, and possibly a greater number, on each of four disk surfaces for two hard disks is about 4.3 inches by 2.8 inches, which footprint is substantially less than that associated with the 3.5 inch disk drive. Additionally, the size and weight of the disk drive apparatus is reduced by the incorporation of a printed circuit board having sufficient physical integrity so that it acts as its own frame or support and to which disk drive electronics, the disk controller and intelligent interface electronics are mounted.

With regard to other inventive features of the disk drive apparatus, in the preferred embodiment, it includes a rotary actuator to which a transducer or read/write head(s) are attached to the free end thereof. The actuator includes a Whitney-style arm assembly having a suspension arm or load beam. A cam following member is fixedly provided on the surface of the load beam adjacent to the read/write head. It is spaced just enough from the head to avoid causing any interference with the head. The member is preferably conical-shaped having a tip for engaging a ramp-type cam surface, which is provided adjacent to the disk. During unloading of the head relative to the disk, the tip of the cam following member rides along the surface of the ramp-type cam surface until it is received in an actuator lock or detent formed at the top of the ramp.

The disk drive apparatus also includes a zero torque flexible circuit having one end attached to the actuator arm assembly and the opposite end fastened at a location remote from the arm assembly and adjacent to, as well as in communication with, electrical leads communicating with the disk drive electronics. The flexible circuit of the present invention is characterized by the fact that it does not exert any torque on the arm assembly. In prior art systems, the flexible circuit is constructed and arranged such that a torque is created on the actuator arm assembly which can affect the track seeking and track following operations. Specifically, in disk drive systems employing a rotary actuator, the flexible circuit produces a torque which tends to force the arm assembly off track thereby causing data transmission errors. Efforts have been made to reduce the generation of the torque. However, as far as is known, prior art systems have been unsuccessful and compensating hardware and/or software has been required to compensate for this parasitic torque. The flexible circuit of the present invention significantly reduces the need for compensating hardware and/or software. In particular, by means of the unique sizing and arranging of the flexible circuit, the unwanted torque is at least substantially reduced. To achieve this objective, it is preferred and convenient for a part of the flexible circuit to be fastened to a portion of the disk drive apparatus near the cam surface assembly and an end of the flexible circuit to be connected to a part of the actuator arm assembly. These attachments of the flexible circuit are made such that a first curved portion of the flexible circuit adjacent to the cam surface assembly can be defined as a concave part of a circle having a first radius and a second curved portion of the flexible circuit adjacent to its end near the actuator arm assembly can be defined as a convex part of a circle having a second radius. The circle having the second radius has its center at the center of rotation of the actuator The two circles having the first and second radii, respectively, are non-concentric and preferably the first radius is greater than the second radius. During movement of the actuator, the magnitude of the first radius changes and the first curved portion approaches a spiral and this change maintains zero torque acting on the actuator arm assembly during the track seeking and following operations.

The disk drive apparatus also includes a spin motor assembly for use in rotating the hard disks whose size is about 2.5 inch disks. Optimum use of space results from its construction. Specifically, the spin motor assembly includes a rotor having a shell and a threaded clamp ring. This configuration, in contrast to prior art, results in greater space for containing spin motor parts including stacked stator laminations and an associated magnet structure. As a result, a larger motor can be contained thereby increasing motor power without detrimentally impacting the size requirements of the spin motor assembly or increasing the size of the disk drive apparatus. Additionally, the clamp ring better accommodates tolerance buildup of adjacent motor parts and exerts even pressure around the hard disks holding them in place so that an increased clamp force results to resist higher "g" loading and substantially prevent disk slippage and concommitant disk run-out.

The disk drive apparatus also includes a servo assembly. The servo assembly is used in controlling movement of the actuator. The servo assembly includes an actuator coil back emf detector that communicates with the actuator. The actuator coil back emf detector is able to more accurately detect a back emf generated signal because of the increased power to mass ratio of the actuator. This unique feature can be expressed in terms of the acceleration constant of the actuator, which equals the force constant of the actuator motor divided by the moment of inertia of the actuator motor. In prior art disk drive systems, the acceleration constant is about 1500 units while the actuator of the present invention is about twenty times that or about 30,000 units. The servo assembly also includes a power amp for outputting a servo correction current signal to the actuator. Because of the greater actuator power, the ratio of the back emf generated signal to the servo correction current signal outputted by the power amp is significantly higher than that found in prior art servo mechanisms, an improvement of about four times the prior art ratio. This greater ratio contributes to the detection of the back emf generated signal, i.e., the ability to identify the back emf generated signal in the presence of the correction or driving signal applied to the actuator coil. As a result, an accurate and precise back emf generated signal can be used to determine the velocity of the actuator arm assembly and its accompanying read/write head. Using the velocity of the arm assembly, desired movement thereof can be controlled and, since the back emf generated signal is always present, the bandwidth of the servo mechanism of the present invention has the potential to be extended.

The disk drive apparatus further includes hardware circuitry, firmware and software for implementing power-saving features. Preferably, two separably controllable power saving modes are provided. The more important of the two power saving modes involves maintaining power to the disk drive intelligent interface electronics, disk controller and the spin motor assembly while powering down virtually all other electronics. In this mode the disk drive microprocessor is maintained in a low power mode, i.e, it is not consuming power due to changing binary states. This mode reduces the power consumption of the disk drive apparatus from about 3.4 watts to about 1.6 watts. In carrying out this mode of power savings, the disk drive spin motor circuitry remains in an operable state and disk drive calibration information is stored in a low power random access memory (RAM). Under software control, this mode of operation is invoked using a default time, e.g., five seconds after the last disk access by the read/write head. Preferably also, the user is able to input a desired time by special command through the intelligent interface, which overrides the default time or, alternatively, the user may disable the default time so that no power saving mode is initiated. To fully recover from this power down, the disk drive apparatus of the present invention requires less than 100 milliseconds. The second mode for lowering power consumption is a spun down deselected mode in which only the disk drive intelligent interface and disk controller are fully powered. In this mode, not only is the disk drive microprocessor in its low power state but the spin motor assembly is powered down. In this mode, there is only about a 0.1 watt power consumption rate and this mode of operation is invoked using a default time, such as between about 15-25 seconds after the last disk access. This mode also enables the user to override the default time using a programmable, desired time or the default time may be disabled. To fully recover from this mode including proper spin up of the hard disk and completion of calibration, about 5 seconds are required. The use of this mode requires that there be the capability of an unlimited number of loads/unloads of the read/write head(s), which is achieved by ramp loading.

In view of the foregoing summary, a number of objectives of the present invention are readily seen as being achieved. A compact and lightweight disk drive is provided characterized by the use of one or more approximately 2.5 inch hard disks. Further contributing to the compact size, as well as the ruggedness of the apparatus, is a rotary-actuated arm assembly having a cam follower member characterized preferably by its conical shape, although it could be spherical or cylindrical. The cone-shaped cam following member, in contrast to rounded-shaped cam buttons, reduces the possibility that the read/write head will crash as a result of an unwanted twist being applied to the suspension arm of the arm assembly during unloading. Space is also optimized by the use of a unique clamp ring as part of the spin motor assembly wherein, for essentially the same amount of space, a larger motor structure is provided. The use of the clamp ring also results in a reduced number of spin motor housing parts, the capability of greater clamping pressure which extends the shock-carrying capability and reduces the possibility of disk slippage and is better suited for robotic assembly of the spin motor. In conjunction with track seeking, a back emf generated signal is available for use during the servo operation to increase the servo bandwidth. A uniquely configured flexible circuit is also provided for preventing any torsional loading on the actuator during operation. Consequently, high performance seeks and accurate track following are achieved without the need to overcome offsets and actuator bias. Power saving modes are also available to reduce battery drain. Further contributions to the reduced size of the disk drive apparatus result from incorporating on a single printed circuit board, without accompanying frame, not only the disk drive electronics and disk controller but the intelligent interface electronics. The use of an intelligent interface permits direct communication with a host computer rather than requiring an additional, separate controller.

Additional advantages of the present invention will be readily seen from the following discussion, particularly when taken in conjunction with the accompanying drawings.

BRIEF DESCRIPTION OF THE DRAWINGS

FIGS. 11A-11C depict in flow chart format electric power saving techniques of the present invention;

DETAILED DESCRIPTION

Figure 1:
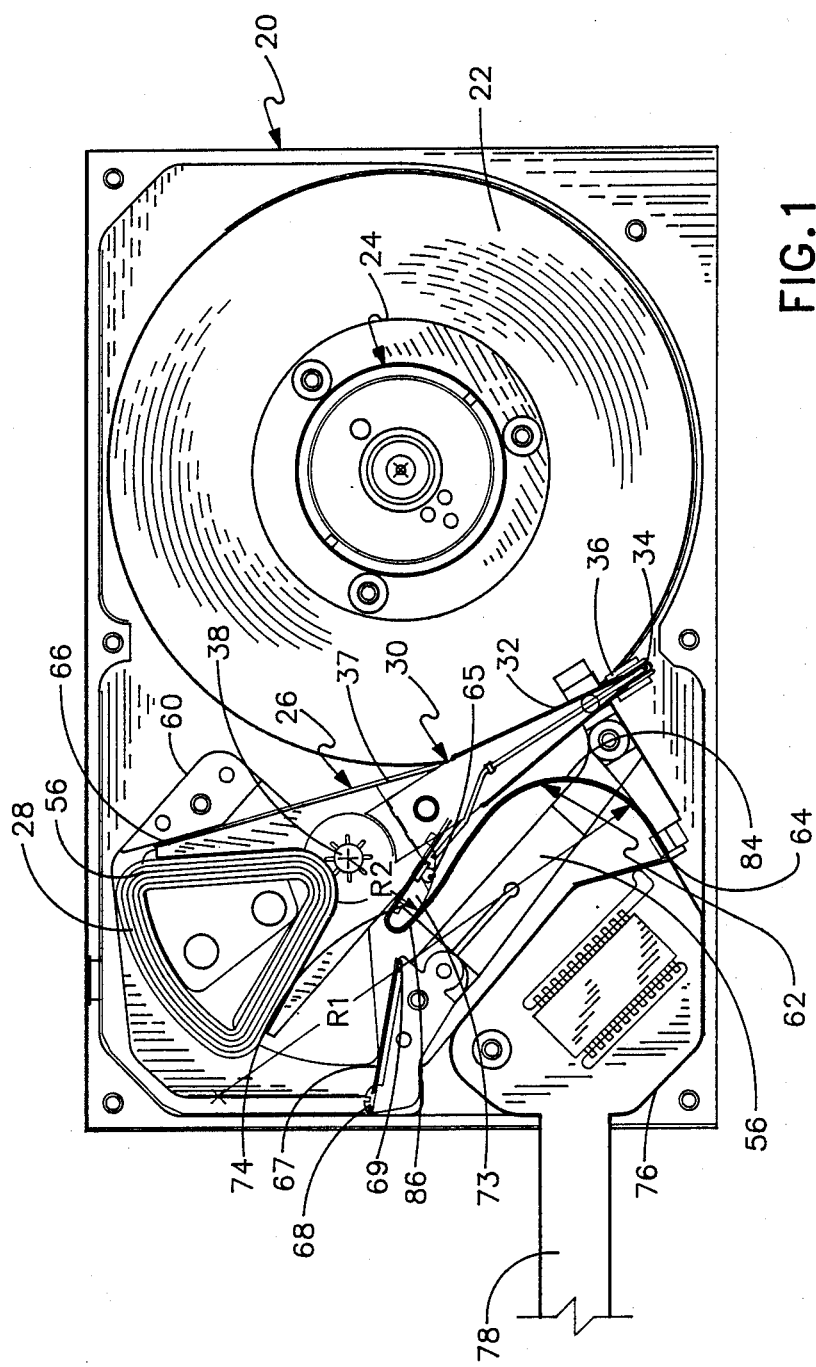
FIG. 1 is a top view of the disk drive apparatus of the present invention illustrating an about 2.5 inch hard disk and the rotary actuator with ramp-type cam surface loading/unloading shown with heads unloaded.

In accordance with the present invention, a disk drive apparatus is provided for use with a computer system, such as a laptop computer. With reference to FIG. 1, the disk drive apparatus includes a housing 20 for containing the disk drive hardware that includes one or more hard disks 22. Each of the disks 22 has preferably an approximately 2.5 inch (2.5-2.75 inch range) diameter and each of the two sides or surfaces of the disk 22 is capable of storing, in present embodiments, about 5-10 Mbytes of information in the formatted state of the disk 22. In the embodiment best illustrated in FIGS. 2 and 4, two hard disks 22 are provided so that 20-40 Mbytes of information are capable of being stored by the disk drive apparatus, although it is expected that this storage capacity will increase due to future enhancements.

Each of the hard disks 22 is rotated by means of a spin motor assembly 24, which assembly is depicted in greater detail in FIG. 7 and will be subsequently discussed herein. As also seen in FIG. 1, a rotary actuator assembly 26 is provided adjacent to the disk 22 for use in reading information and writing information onto the surface of the disk 22. The actuator assembly 26 includes an actuator coil 28 through which current is passed for causing rotational movement of the actuator assembly 26. An actuator arm assembly 30 is also part of the actuator assembly 26 and the actuator arm assembly 30 embodies Whitney-style technology which is described in the above-noted U.S. Pat. Nos. 4,167,765 and 4,535,374. The actuator arm assembly 30 includes an actuator arm or load beam 32 which is generally triangular-shaped. Disposed adjacent to the free end of the load beam 32 is a flexure 34. A transducer or read/write head 36 is attached to the flexure 34 and extends therefrom in a direction towards the surface of the disk 22. The actuator arm 32 is connected to an actuator body 37. The actuator body 37 incorporates the actuator pivot 38, which constitutes the pivotal axis about which the actuator arm assembly 30 is able to rotate in order to access desired or target positions on the disk surface.

Figure 2:
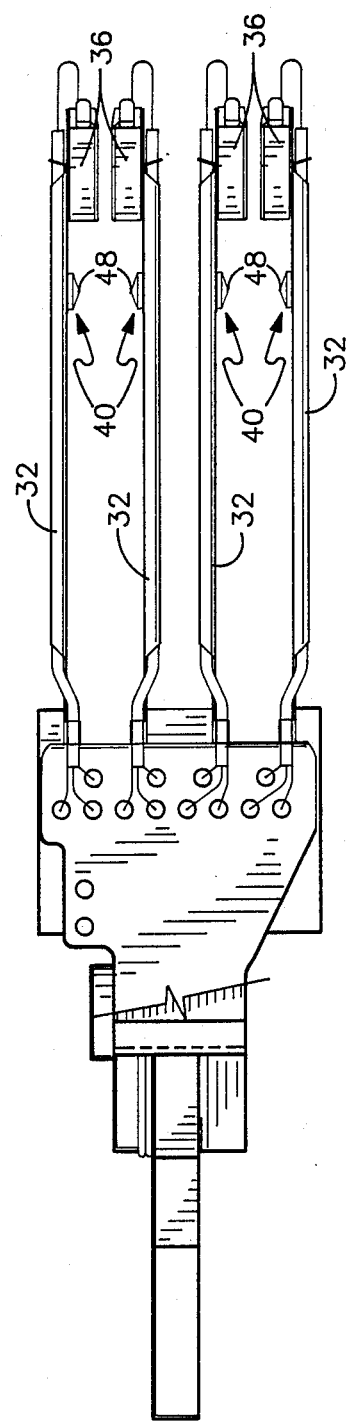
FIG. 2 is a side view illustrating four actuator arms in connection with a two disk embodiment.
Figure 4A:
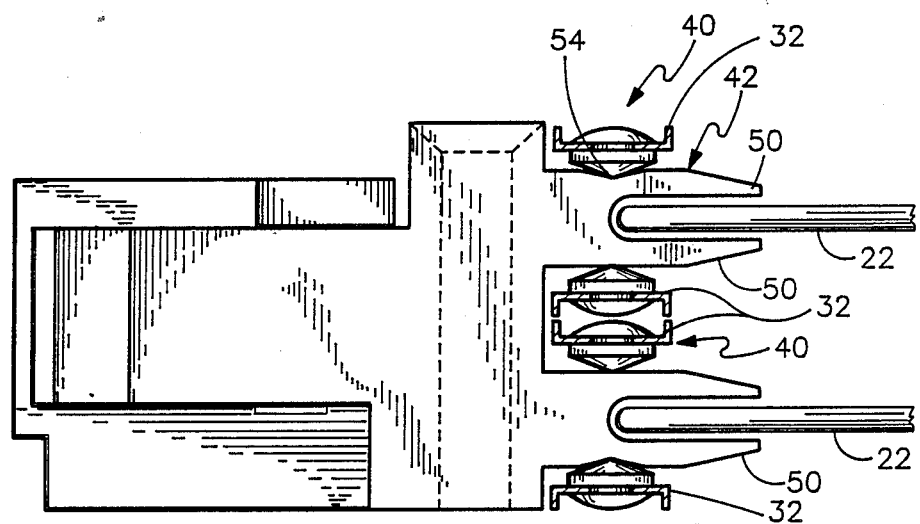
FIGS. 4A-4C illustrate unloading to loading steps associated with the read/write head particularly movement of the cam following member along the cam surface ramp member.
Figure 4B:
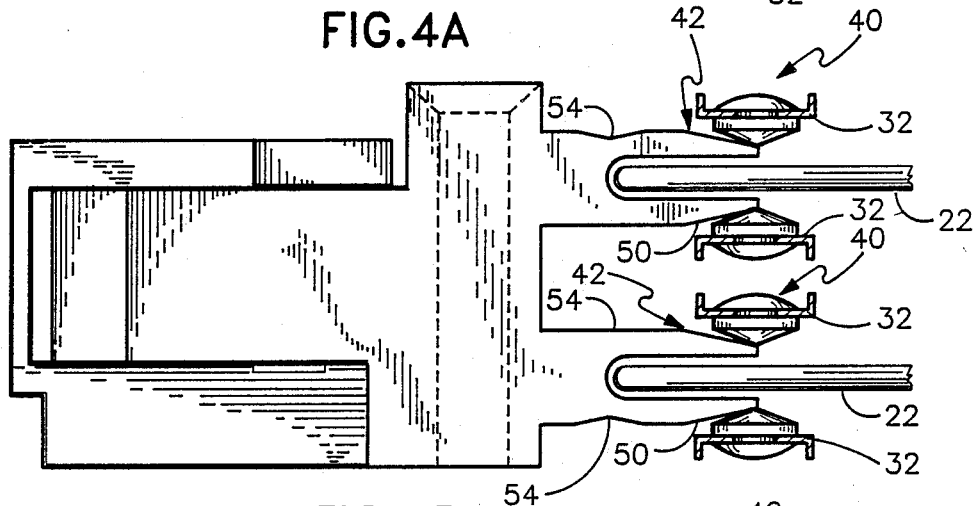
Figure 4C:
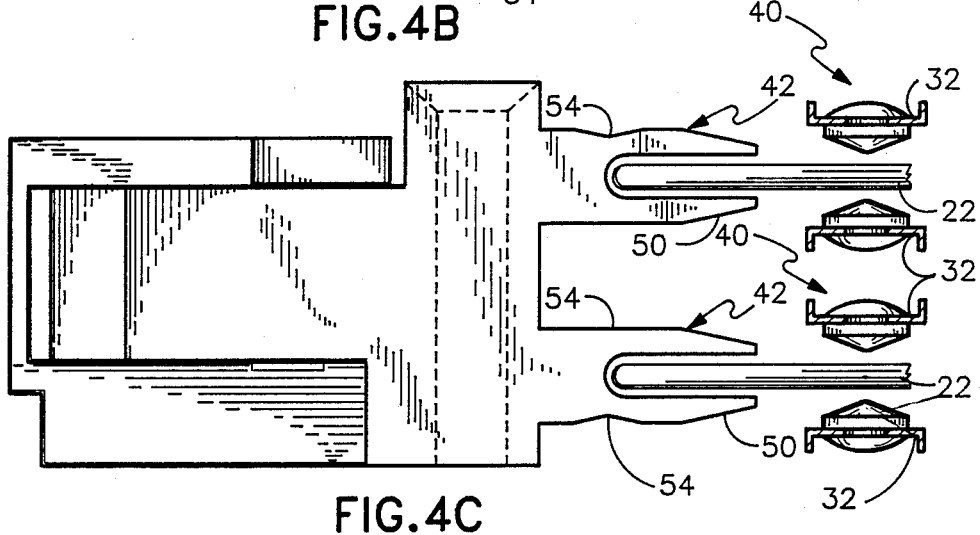

The actuator arm assembly 30 also includes a cam following member 40, which is located on the surface of the actuator arm 32 having the read/write head 36, as best seen in FIG. 2. The cam following member 40 cooperates with a ramp-type cam surface assembly 42, as best illustrated in FIGS. 4A-4C and which forms the cam surface, for loading/unloading the read/write head(s) 36. As seen in FIG. 2, the cam following member 40 includes a connector piece 44 which is used in affixing the cam following member 40 to the actuator arm 32. The cam following member 40 also includes a body portion 46 that converges to a tip 48 and thereby defines a conical or cone-shaped structure. As seen in FIGS. 4A-4C, the body portion 46 becomes generally hemi-spherical due to ultrasonic welding thereof to the actuator arm 32. The cam following member 40 is located inwardly of the read/write head 36 preferably as close to the head 36 as is possible without interfering with the head 36. Preferably, the entire cam following member 40 is disposed between midportions of the length of the actuator arm 32 and the inward edge of the read/write head 36. Such a location is preferred so that any error in controlling the read/write head 36 during movement thereof is not magnified as would be the case when the cam following member 40 is positioned relatively closer to the actuator pivot.

The ramp-type cam surface assembly 42 is fixed to the housing 20 at a predetermined position such that the cam following member 40 is able to properly engage and function with the cam surface assembly 42 for loading/unloading the read/write head 36. The cam surface assembly 42 includes a cam surface ramp member 50 having an inclined outer face that is configured to provide a track for the approximately spiral movement of the cam following member 40. The cam surface ramp member 50 increases in height in a direction away from the disk surface. The cam surface ramp member 50 has an actuator lock or detent 54 formed therein at the top of the ramp or inclined face of the cam surface ramp member 50. The actuator lock 54 acts as a receiving area for the cam following member 40 when the read/write head 36 is unloaded relative to the disk 22 for locking the actuator arm 32 in a safe attitude during non-operating shocks and vibrations.

As seen in FIG. 1, a linking member 56 is connected to the cam surface assembly 42 and is connected at its opposite end to a support frame 60. The linking member 56 is important in enabling the actuator assembly 26 and the cam surface assembly 42, as well as the support frame 60, to be assembled all together before being positioned and affixed to the housing 20. In particular, the actuator assembly 26 and the cam surface assembly 42 are joined together during assembly using the linking member 56 with the actuator arm assembly 30 being located in its unloaded state in which the cam following member 40 is disposed in the actuator lock 54 of the cam surface assembly 42. Consequently, all of these parts are properly aligned and positioned so that it is only necessary to fasten them to the housing 20 whereby desired loading of the read/write head(s) 36 can be subsequently accomplished easily by robots, for example.

A further important part of the disk drive apparatus, as illustrated schematically in FIG. 1, is the flexible circuit 62. The flexible circuit 62 is comprised of a flexible material with etched circuitry for use in, among other things, transmitting information from and to the read/write head(s) 36. A portion of the flexible circuit 62 is attached near the cam surface assembly 42 using a clip 64 while an end portion of the flexible circuit 62 is attached to the actuator body 37 using a screw 65. During rotational movement of the actuator body 37, the flexible circuit 62 is able to change its configuration so that zero torque is applied by the flexible circuit 62 to the actuator assembly 26. The detailed aspects of the flexible circuit 62 will be subsequently discussed herein.

Figure 3:
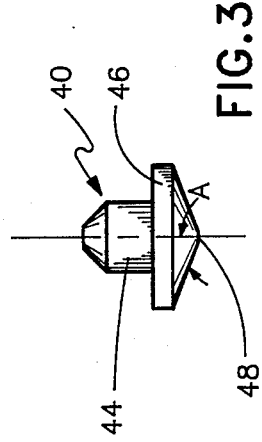
FIG. 3 is an enlarged view of the cam following member for affixing to the actuator arm.

In connection with the loading/unloading of the read/write head(s) 36, reference is made to FIGS. 4A-4C. The unloaded state of the actuator arm assembly 30 is illustrated in FIG. 4A. As can be seen, the cam following member tip 48 rests in the actuator lock 54 formed at the top portion of the cam surface ramp member 50. When the actuator arm assembly 30 is to be loaded relative to the disk 22, the actuator assembly 26 is activated for causing the actuator arm assembly 30 to pivot or rotate in a direction towards the spin motor assembly 24. During this rotational movement, the tip 48 of the cam following member 40 is initially unlocked by moving out of the actuator lock 54. The tip 48 then moves downwardly along the inclined surface of the cam surface ramp member 50, with essentially only the tip 48 of the cam following member 40 being in contact with the cam surface ramp member 50, as illustrated in FIG. 4B. To achieve this contact, the angle (A), see FIG. 3, of the tip 48 is less than the angle of the cam surface ramp member 50. The engagement between only the tip 48 and the cam surface ramp member 50 reduces the possibility that a torque will be produced causing an unwanted slight twisting or turning of the actuator arm assembly 30. Where the cam following piece is a button or semi-hemispherical element, the undesirable possibility exists that contact between the button portion and the cam surface ramp member will occur along a line offset or displaced from the preload force acting in a direction towards the cam surface assembly 42. As a consequence, a moment arm is created and a torque exists that might cause a twisting or turning of the actuator arm assembly 30. Because of the tip construction, such a possibility is eliminated or at least substantially reduced in the present invention.

As illustrated in FIG. 4C, at the completion of the loading stage, the cam following member 40 including the tip 48 is no longer supported by the cam surface ramp member 50 but is spaced at desired distance therefrom for accessing a target position on the disk surface. In connection with unloading and locking the arm assembly 30, the steps taken to achieve the unloading and locking of the read/write head 36 are essentially the reverse of those steps taken for unlocking and loading the read/write head 36 relative to the disk 22. That is, upon preselected command, the actuator arm assembly 30 is caused to pivot or rotate in a direction away from the disk 22 towards the cam surface assembly 42 whereby the tip 48 of the cam following member 40 contacts the outer inclined surface of the cam surface ramp member 50. As the actuator arm assembly 30 continues to pivot, the tip 48 moves upwardly along the cam surface ramp member 50 until it is received by the actuator lock 54, where it is locked until the disk 22 is again loaded.

The loading/unloading of the read/write head(s) 36 using the cam following member 40 and ramp-type cam assembly 42 is intended to prevent contact between the read/write head(s) 36 and the disk surface. The read/write head(s) 36 launch onto a fully developed hydrodynamic air bearing so that there is no contact between the disk surface and the read/write head(s) 36 thereby preventing wear. In contrast, prior art contact start/stop disk head technology typically allows only about 10,000 spin downs and spin ups before significant media damage and disk contamination occurs. This is unacceptable in a portable computer system in which the disk drive is often powered down during periods of inactivity to conserve battery life. The dynamic head loading also contributes to the ruggedness of the disk drive apparatus. The ramp-type cam surface loading assembly substantially reduces the possibility of read/write head slap when the apparatus is powered down. Preferably, the disk drive apparatus of the present invention is able to withstand up to a 200 g force for about a 10 millisecond duration in a non-operating environment. The ramp-type cam surface loading assembly also substantially prevents the likelihood that stiction would occur on the thin film disk media because the read/write head(s) 36 do not land on the disk surface. Stiction is basically an unintentional adhesion between the read/write head(s) and the disk media and is a problem that occurs in conventional start/stop disk drives. Additionally, because rotary ramp loading is provided, a more powerful actuator is required to accomplish the necessary ramp-type cam surface loading and unloading using spin motor back emf. In prior art systems, the torque required for achieving ramp loading/unloading is substantially equal to the torque required for performing the seek operation. The present invention requires a higher torque constant and, as a consequence, a significantly greater acceleration constant for its actuator motor in order to perform the ramp loading/unloading than is required to perform seek operations. In the present invention, the acceleration constant of the actuator motor preferably has a value of about 30,000 units; whereas, in prior art comparable systems, the actuator has a torque constant of about 1,500 units, which is 20 times less. Further significance of the high acceleration constant will be noted later in connection with the servo operation.

With further reference to FIG. 1, the disk drive apparatus also includes a pair of crash stop members 66, 67. The crash stop member 66 is joined to the support frame 60 and is preferably made out of an elastomeric material. The crash stop member 67 is preferably a cantilevered spring fixed at one end using a screw 68 or the like. The opposite end of the cantilevered spring 67 rests on a boss 69 in a non-preloaded condition. The crash stop members 66, 67 act as safeguards to provide controlled deceleration of the actuator arm assembly 26 and prevent rotation thereof beyond predetermined limits.

Figure 5:
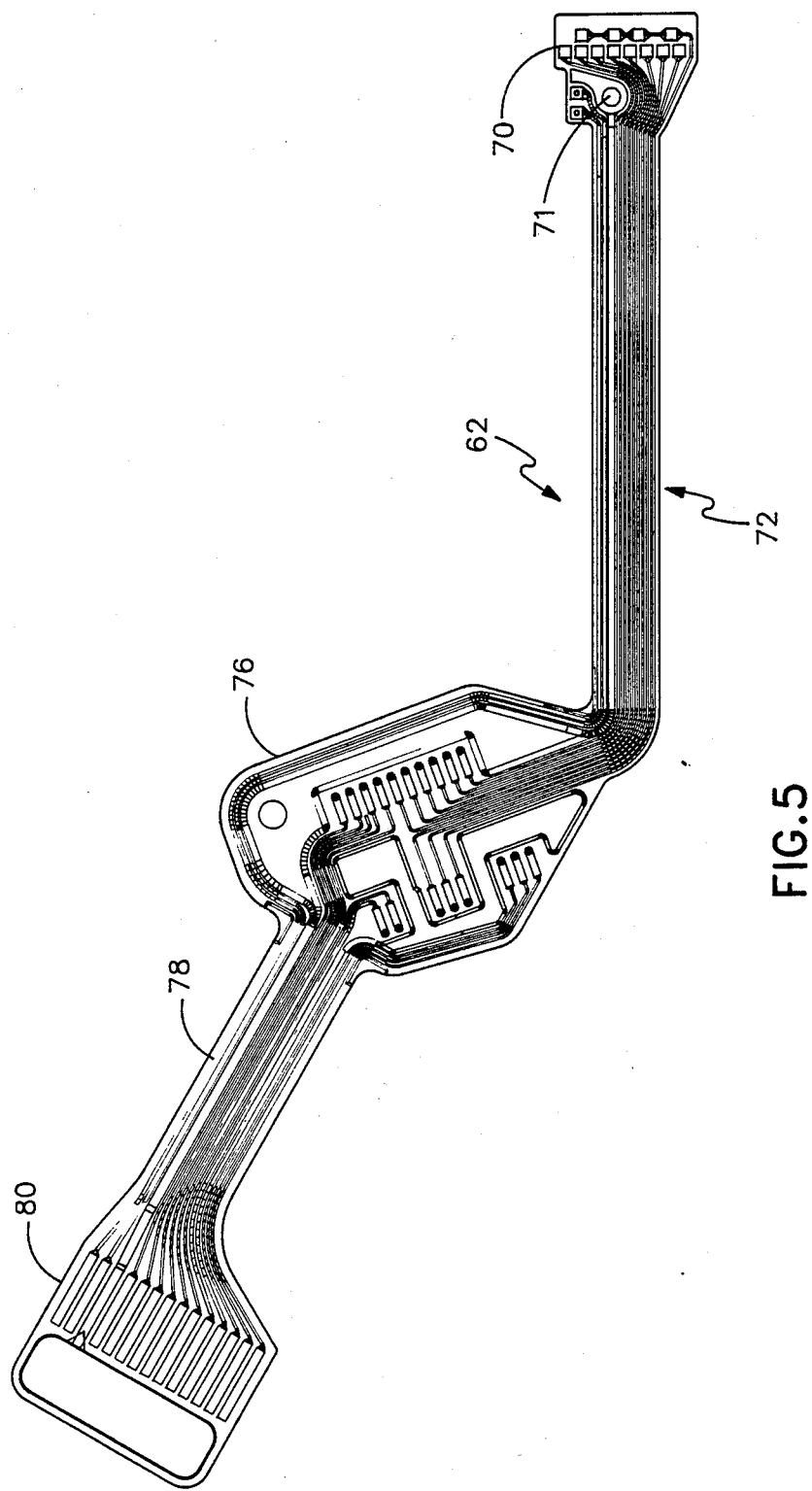
FIG. 5 illustrates the flexible circuit of the present invention.
Figure 6:
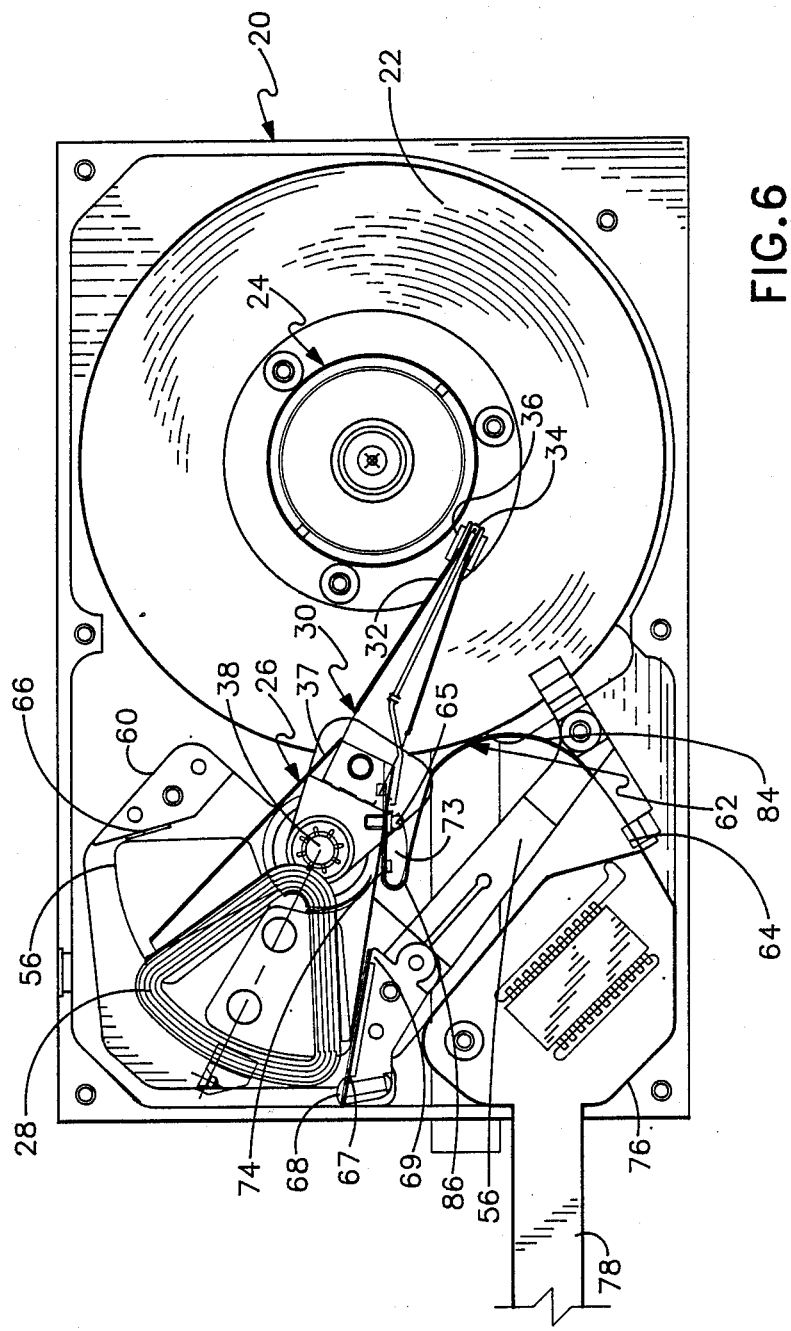
FIG. 6 illustrates the position of the flexible circuit when the read/write head is in a loaded position near an inner boundary of the disk in comparison with the configuration of the flexible circuit of FIG. 1 when the read/write head is in the unloaded position.

With reference to FIGS. 5 and 6, as well as FIG. 1, the flexible circuit 62 is now described in greater detail. As seen in FIG. 5, the flexible circuit 62 includes an end portion 70, which is attached to the actuator assembly 26 using the screw 65 positioned through a hole 71 formed in the end portion 70. A strip 72, which is integral with the end portion 70, is disposed about a concentric member 73, which is held adjacent to the actuator assembly 26. This portion of the strip 72 is held against the concentric member 73 using a clip or clamp-like piece 74. The concentric member includes an outer surface portion having a curved portion defined by a radius with a center at the actuator pivot 38. The opposite end portion of the strip 70 is joined to the end of the ramp assembly 42 using the clip 64. The strip 72 has etched conducting lines for transmitting signal information associated with disk read/write and servo operations, as well as providing communication with the actuator coil and also including a ground line. Integral with the strip 72 is an etched area 76 on which a circuit chip is placed, namely the read/write amplifier chip. A further length 78 of the flexible circuit 62 has etched conducting lines for carrying signal information to an electric connector 80, which provides a signal path between the flexible circuit 62 and further processing-/controlling electronics mounted on a printed circuit board.

The novelty of the flexible circuit 62 lies primarily in the geometric arrangement or configuration of the strip 72. The strip 72 is arranged between the end portion 70, which is located at the actuator assembly 26, and the clip 74, which is located at the cam surface assembly 42, such that the flexible circuit 62 does not cause a torque to develop against the actuator arm assembly 30. Consequently, an unwanted torque is not applied to the actuator arm assembly 30 during its rotational movement, such as occurs for track seeking or track following. To achieve this zero torque, the flexible circuit strip 72 is arranged to define two different radii. In particular, with reference to FIG. 1, a first radius ($R_1$) is defined near the clip 64 and a second radius ($R_2$) is defined adjacent to the concentric member 73. The first radius can be used to define a first circle and the second radius can be used to define a second circle. The two circles are non-concentric wherein a first curved portion 84 of the strip 72 is created adjacent to the clip 64 and a second curved portion 86 is created adjacent to the concentric member 73. The first curved portion 84 is concave while the second curved portion 86 is convex and has its center at the actuator pivot 38. The geometric configuration of the flexible circuit strip 72, that has the different curved portions 84, 86, results in the summation of substantially equal and opposite torques whereby no torque is applied to the actuator arm assembly 30. The two different radii result in a flexible circuit configuration that maintains zero torque application throughout the entire range of motion of the actuator arm assembly 30. As can be understood from viewing FIG. 1, the magnitude of the radius associated with the first curved portion 84 is greater than that radius associated with the curved portion 86 and this radius changes during movement of the actuator arm assembly 30 thereby substantially defining a spiral.

With reference to FIG. 1, the position of the strip 72 of the flexible circuit 62 is illustrated when the actuator arm assembly 30 is unloaded relative to the disk 22. In this position, the first radius in the embodiment utilizing two hard disks 22 is about 2.15 inches. With reference to FIG. 6, when the read/write head(s) 36 are loaded relative to the disk 22 and the actuator arm assembly 30 rotates in a direction towards the spin motor assembly 24, the flexible circuit 62, particularly the curved portion 84 of the strip 72, adjusts or moves wherein the curved portion 84 becomes more pronounced as the first radius associated therewith becomes less. The geometric configuration or arrangement of the flexible circuit 62 has been designed such that the movement or adjustment thereof due to the rotary actuator movement results in zero torque being applied to the actuator arm assembly 30 while using a standard 0.0055 inch thickness for the flexible circuit 62. With regard to known prior art flexible circuits, attempts have been made to reduce the torque by reducing the thickness of the flexible circuit. However, this has not proven to be feasible because the physical integrity of the flexible circuit suffers or is lost. Increasing the length of flexible circuit creates unwanted resonances adversely affecting operation of the disk drive. Because of this unwanted torque, the common prior art solution is to include additional hardware and/or software to compensate for the torque to attempt to insure that the read/write head(s) 36 are maintained at the target position on the disk but errors nevertheless result.

Figure 7:
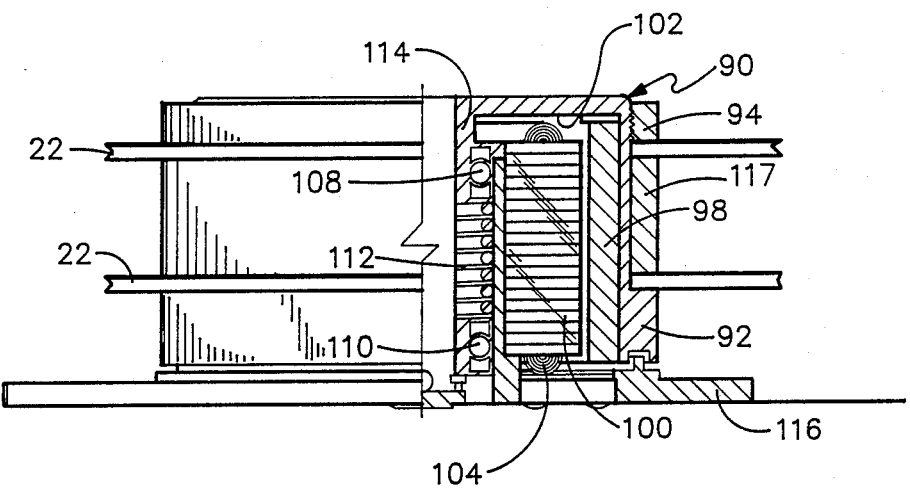
FIG. 7 illustrates the spin motor with portions thereof being cut-away to expose spin motor parts.
Figure 8:
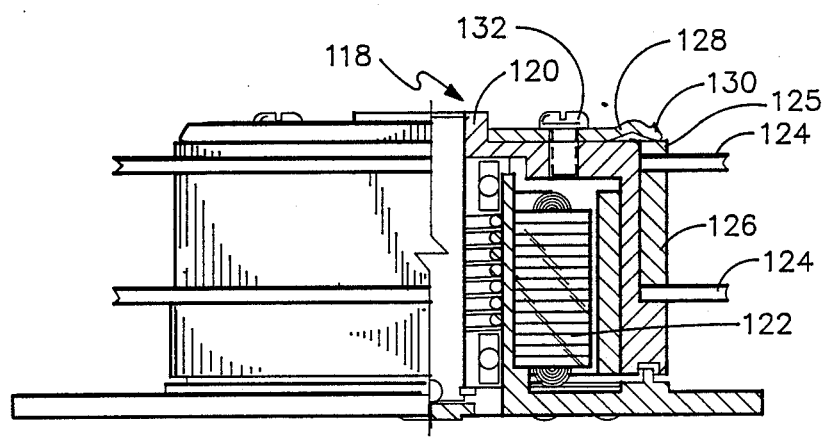
FIG. 8 is a prior art illustration of a conventional clamping arrangement.

With reference now to FIGS. 7 and 8, the spin motor assembly 24 includes a rotor assembly 90 to which the disks 22 are mounted. During operation, the rotor assembly 90 spins or rotates and carries the disks 22 with it. The rotor assembly 90 includes a shell or body 92 within which further motor parts are contained. A clamp ring 94 is connected to the top of the shell 92. The clamp ring 94 is preferably threaded for engaging an upper circumferential edge of the shell 92 whereby the clamp ring 94 is fastened to the shell 92. Adjacent to the inner wall of the shell 92 is a magnet 98, which is also part of the rotor assembly 90. Contained within the shell 92 are motor stator parts including a number of stator laminations 100, which are located in a chamber 102. Disposed within the stator 100 is magnet wire windings 104. A pair of bearings 108, 110 are provided at the end portions of the longitudinal stator lamination stack. A compression spring 112 is held between the two bearings 108, 110 for use in preloading the bearings 108, 110. The spring 112 surrounds portions of a motor shaft 114. The motor shaft 114 is integral with the top of the shell 92 and extends towards the bottom of the shell 92. As can be readily appreciated, the aforesaid motor parts are also found in the non-cut away part of FIG. 7 of the spin motor assembly 24 since there is symmetry between the two sides of the spin motor assembly 24. The rotor assembly 90 moves relative to a base member 116, which is slightly spaced from the bottom of the rotor assembly 90 and carries the two disks 22 with it, which disks 22 are separated using a spacer 117.

To better understand the unique aspects of the spin motor assembly 24, reference is made to FIG. 8, which illustrates a known clamp disk type of construction. A spin motor 118 includes a rotor 120 and a stator 122 housed within the rotor 120. A pair of hard disks 124 are located in desired positions utilizing spacers 125, 126. Unlike the present invention, clamping of the disks 124 so that they remain in the desired position is accomplished using a spring clamp disk 128 having a spring-like or resilient circumferential edge 130. The edge 130 engages the cylindrical-shaped spacer 125. In another known embodiment, the edge 130 directly engages a portion of the disk 124. The clamp disk 128 is held in place by a number of screws 132 that extend through holes formed in the clamp disk 128 and into an upper portion of the rotor 120.

As can be understood from a comparison of the prior art spin motor 118 of FIG. 8 with the spin motor assembly 24 of the present invention, the use of the clamp ring 94 significantly enhances the size of the chamber 102 so that the stator lamination stack 100 is increased over the prior art stator lamination stack thereby providing a relatively more powerful spin motor than that found in the prior art. That is, in the known assembly, the space taken by the screws 132 results in a smaller, less powerful motor. The use of the clamp ring 94 also results in increased clamping force being applied to the disks 22, in comparison with the use of the screws 132 and the spring-like clamp disk 128. Also because of the clamp ring 94, a more even clamping force or pressure is applied to the disks 22 whereby disk slippage and accompanying disk run-out are substantially avoided. Relatedly, the tapered threads of the clamp ring 94 facilitate offsetting of tolerance build-ups without loss of clamping force. Additionally, the spin motor assembly 24 has fewer parts and is better suited for robotic assembly than the illustrated spin motor 118.

Servo control of the disk drive apparatus is next discussed with reference particularly to FIG. 9. The approximately 2.5 inch hard disk 22 and the actuator assembly 26 are schematically illustrated, together with the spin motor assembly 24. The spin motor assembly 24 is powered using spin motor circuitry 140. Activation of the circuitry 140 is controlled using a spin sequencer 142. Control of the spin sequencer 142 is based in a software-controlled microprocessor 144.

As previously discussed, the actuator assembly 26 is controlled to position the read/write head(s) 36 relative to a target position on the surface of the disk 22 so that data or other information can be read from or written onto the target position. Control of the actuator assembly 26 resides in servo circuitry. Specifically, a read/write amplifier 146 is located on the etched area 76 and communicates with the read/write head(s) 36 using the conducting lines of the flexible circuit 62. The read/write amplifier 146 amplifies the analog signal transmitted to or from the read/write head(s) 36. In the case of the read operation, when the read/write head(s) 36 are located relative to a target position on the disk 22 and information is to be read therefrom, the read information is amplified by the read/write amplifier 146 and transmitted to an automatic gain control (AGC) circuit 150. The AGC 150 is used in controlling the magnitude of the read signal and outputs a signal having a desired amplitude. The output from the AGC 150 is sent to a filter 152 for filtering or removing high frequency noise from the signal obtained by reading the data or information from the disk 22. The filtered signal is applied to a position detector 154 and a pulse detector 156. Under control of a servo burst sequencer 160, the position detector circuitry 154 is able to read servo signal information or the servo burst received from the formatted surface of the disk 22.

The disk 22 stores servo information embedded in the user data or other information. The embedded servo information is used during the servo operation for controlling movement of the actuator assembly 26. The formatted disk includes fine position information and coarse position information. The fine position information is peak detected by the position detector circuitry 154. The coarse information relates to the track address stored on the disk surface and which constitutes part of the servo burst. The track address is sent to the servo burst sequencer 160 and then transmitted on to the microprocessor 144.

The servo burst sequencer 160 also monitors the output of the pulse detector 156, which is used in providing the microprocessor 144 with information relating to the direction of movement of the read/write head(s) 36. The microprocessor 144 also controls the servo burst sequencer 160 so that the servo related information is properly processed by the position detector 154. The output of the position detector 154 is applied to a buffer 162, which acts as a unity gain amplifier and isolates the position detector 154 from the analog to digital (A-D) converter 164. The A-D converter converts the position detector output position data to digital form for processing by the microprocessor 144.

The servo information analyzed or processed by the microprocessor 144 is used in determining the velocity and position of the read/write head 36 from which a determination can be made as to the distance remaining to the target position on the disk 22. Using the remaining distance, the microprocessor and its accompanying software generate a digital signal for use in controlling the rotary movement of the actuator assembly 26. In that regard, a digital servo control signal is outputted by the microprocessor 144 to the digital-to-analog (D/A) converter 166, which converts the digital signal to an analog signal for transmission to a servo mode control unit 168 of actuator circuitry 169. The servo mode control 168 outputs a servo correction voltage signal proportional to the amount of current needed to correct the current through the actuator coil 28 so that the current through the coil 28 corresponds to a predetermined magnitude for controlling movement of the actuator whereby the read/write head 36 rapidly and accurately reaches the disk target position. A power amplifier 170 provides the correction current using the inputted servo correction voltage. In connection with generating the servo correction voltage signal, the servo mode control 168 combines the servo control signal outputted by the D/A converter 166 and the output of an actuator back electromotive force (emf) detector 174. The actuator back emf detector 174 communicates with the actuator assembly 26, particularly the coil 28 thereof.

As is well known, a coil section moving in a magnetic field produces a back emf generated signal which is proportional to the velocity of the moving coil section. Since the section of the coil 28 being monitored is being pivoted or rotated along with the actuator arm assembly 30, the back emf of the coil section produces a back emf generated signal which is directly proportional to the velocity of the actuator arm assembly 30. The back emf generated signal detected by the actuator back emf detector 174 is also transmitted to the microprocessor 144 through the A/D converter 164. The microprocessor 144 uses the back emf generated signal, together with other known parameters such as the number of turns of the actuator coil 28 and the strength of the actuator magnetic field that have already been taken into account in predetermined values stored in a look-up table, to determine the distance remaining to the target position on the disk 22. From the distance remaining, a desired actuator velocity is obtained. Using the desired velocity, the servo control signal outputted by the D/A converter 166 can be generated. Since a correction signal is to be generated, the back emf generated signal representing the current actual velocity of the actuator is fed back to the servo mode control 168 and combined with the servo control signal representing the desired or selected velocity of the actuator. The combining of these two signals results in the generation of the servo correction signal for subsequently providing any desired change in the amount of current through the coil 28.

In prior art disk drives, the back emf has not been utilized because of the significant difficulty encountered in attempting to identify it in the presence of the servo signal applied to the actuator coil 28. Typically, the back emf generated signal is considerably less in magnitude than is the servo signal and therefore it is difficult for the servo circuitry to accurately sense the back emf generated signal and distinguish it from the servo signal. Consequently, an accurately isolated back emf generated signal cannot be obtained and used for precisely determining the velocity of the actuator arm assembly 30. As previously noted, the present invention requires a more powerful actuator motor having a substantially greater acceleration constant than that found in prior art disk drives. Because of the more powerful actuator motor, the servo correction signal outputted by the power amplifier 170 to the coil 28 is in the range of about 40-80 milliamps, instead of a typical 1-2 amps found in the prior art. Because of the smaller servo correction signal, the actuator back emf generated signal is more easily identified and determined since its magnitude is much greater than that of the servo correction signal. As an example, the signal/noise ratio (back emf generated signal/servo correction signal) in the present invention is about four times greater than that found in prior art systems.

Another feature of the invention involves use of the back emf associated with the spin motor assembly 24 to control movement of the actuator assembly 26 during an unloading operation. Specifically, the spinning disks 22 provide a source of kinetic energy wherein the voltage generated by the spindle back emf is transferred to the actuator coil when a power supply voltage monitor detects a decrease in voltage. For example, when the disk drive apparatus is being powered down, the loss in voltage is sensed and the spindle motor back emf from the spin motor circuitry 140 is applied to the power amplifier 170, as indicated in FIG. 9. As a consequence, the read/write head(s) are unloaded properly and contact between the heads 36 and the disk surfaces is avoided.

Figure 9:
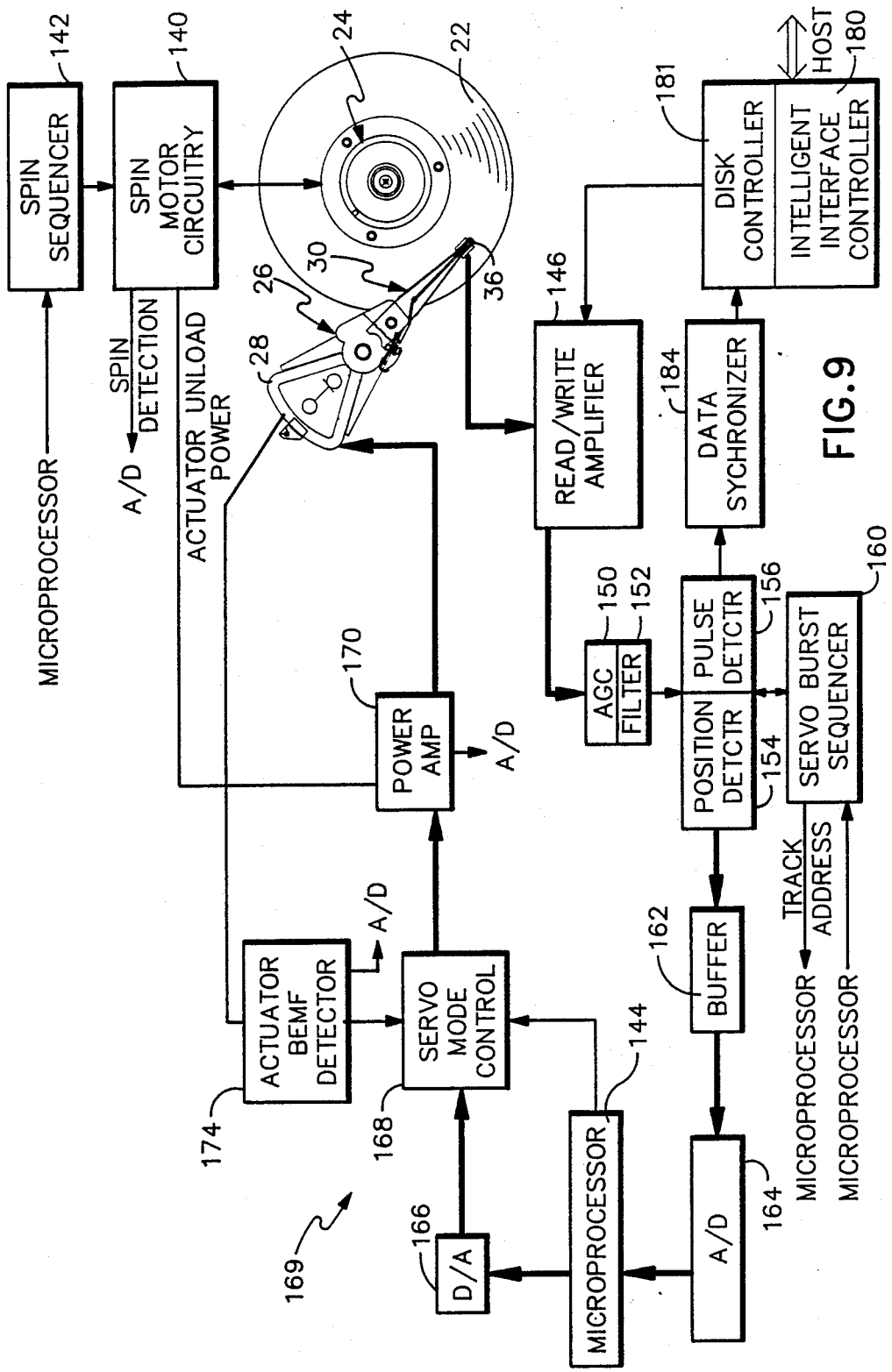
FIG. 9 is a block diagram illustrating analog circuitry of the disk drive including read/write and spin circuitry as well as disk drive intelligent interface electronics.
Figure 10:
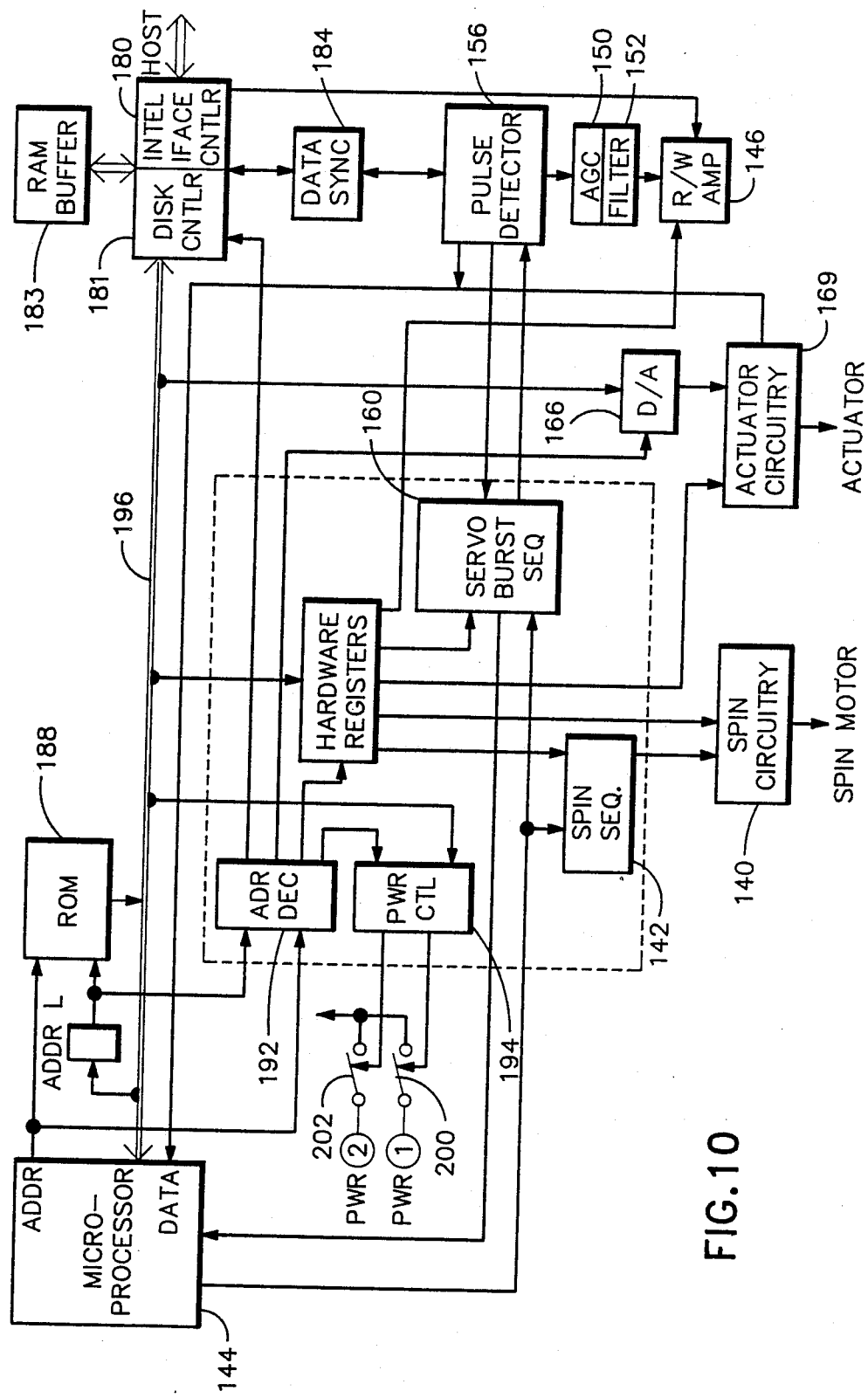
FIG. 10 is a block diagram illustrating digital drive control and interface control, as well as electric power saving circuitry.

Also schematically illustrated in FIG. 9, as well as in FIG. 10, is an intelligent interface controller or electronics 180, which provides communication between a disk drive controller 181 and a computer system exterior to the disk drive apparatus, such as an IBM-AT microcomputer. The intelligent interface controller 180 is an intelligent controller that includes or provides all the control and handshaking necessary for proper communication between the computer system and the disk drive apparatus. Generally, the intelligent interface controller 180 includes an eight or sixteen bit bus having a predetermined protocol for controlling the flow of information to and from the disk controller 181 and the accompanying computer system. The disk controller 181 generates command and position information for transmission to the disk drive electronics for controlling internal functions of the disk drive electronics and also formats data in both directions for the disk drive electronics and the intelligent interface controller 180. In connection with writing user data or information on the disk 22, the intelligent interface controller 180 receives the information from the computer system and transmits it to the disk controller 181, which sends it to the read/write amplifier 146 for subsequent transmission to the read/write head(s) 36 and subsequent writing thereof on the disk 22. As illustrated in FIG. 10, the intelligent interface controller 180 preferably communicates with a random access memory (RAM) buffer so that data being transferred can be stored therein when needed in order to facilitate efficient data transfer between the computer system and the disk drive apparatus. In connection with utilization of data read from the disk 22, the disk controller 181 communicates and receives the output from a data synchronizer 184, which synchronizes a VCO with a data stream to provide equal time slots, with each time slot being a presence or absence of a data pulse for determining the data contained within the data stream. This synchronized clock signal and pulses synchronized to that clock signal provide a means for communicating data to the disk controller 181. The input to the data synchronizer 184 is supplied by the pulse detector 156, which detects pulses constituting data read or obtained from the disk 22.

In addition to servo-related circuitry, the present invention also includes power conservation modes implemented by hardware and software. With reference to FIGS. 10 and 11A–11C, the power saving features will next be discussed. In the preferred embodiment, there are two power saving modes, with the two modes being distinguished by the level of power reduction and an associated response time for recovery. In a first mode of power savings, only the spin motor assembly 24, including the spin motor circuitry 140 and the spin sequencer 142, disk controller 181 and the intelligent interface controller 180 receive electric power. The remaining circuitry is powered down while the microprocessor 144 is maintained in a "low power" mode, i.e., there is virtually no power consumption by the microprocessor 144 because there is no activity or changing of binary states in the microprocessor when this first mode is invoked. This first mode reduces the rate of power consumption in the illustrated embodiment to about 1.6 watts. The first mode of power savings has a default time associated therewith. That is, after the passage of a predetermined amount of time since the last disk access, the first mode of power savings is invoked. The default time may, for example, be in the range of 2–5 seconds. The default time may be overridden by the user disabling the default time or by the user inputting or programming another predetermined time that substitutes for the default time. Full recovery from this first mode requires less than 100 milliseconds. The first mode is an important mode since a considerable savings of power is achieved while still keeping the recovery time to less than 100 milliseconds. The second mode of power savings shuts down all electronics illustrated in FIGS. 9 and 10 except for the disk controller 181 and the disk drive intelligent interface controller 180 and reduces the power consumption by the apparatus to 0.1 watt.

The second mode also has a default time, preferably in the range of 15–25 seconds, from the last disk access and about 5 seconds is required for the apparatus to fully recover from the second mode. The second mode can also be disabled or the default time overridden by user control. The second mode of power savings is made feasible through the use of the ramp loading assembly which permits virtually unlimited starts and stops, in contrast with contact start/stop loading/unloading in which only a limited number of power downs can be performed without significant damage to the disk medium.

Figure 11A:
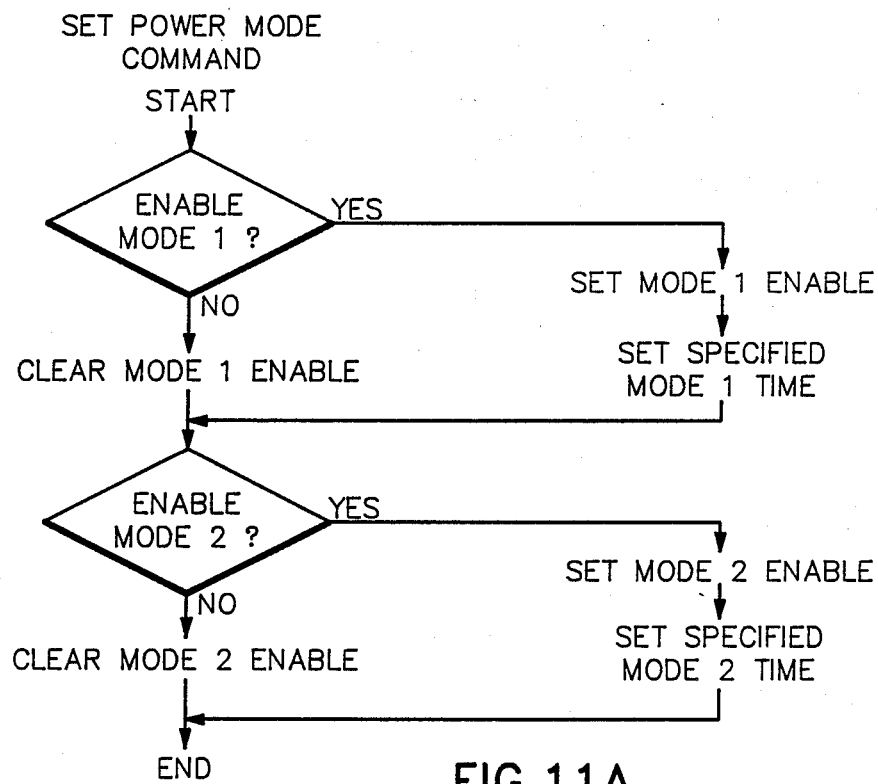
Figure 11B:
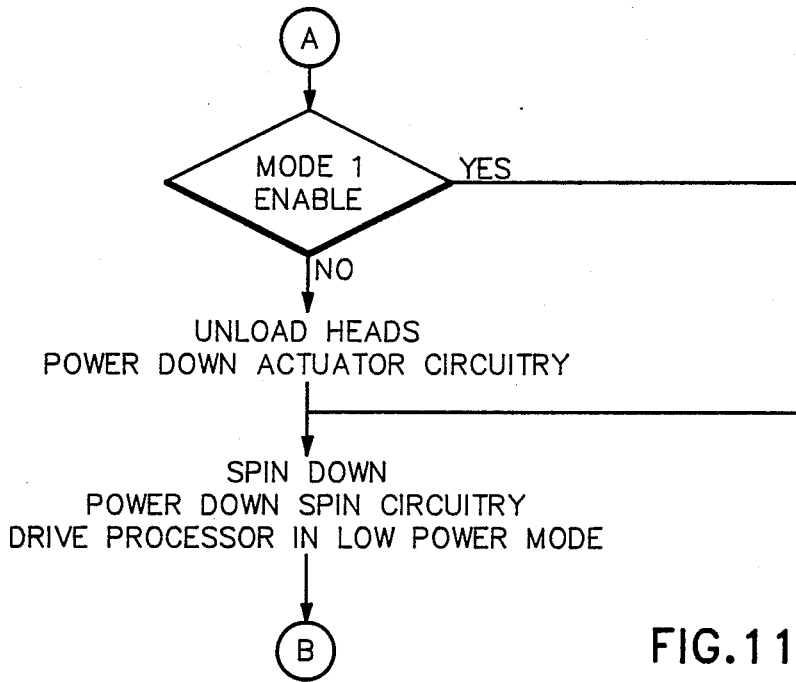

The flow charts of FIGS. 11A–11C illustrate one embodiment associated with implementing the power saving modes, although it is understood that a number of other specific steps could be used to implement the power saving modes. The steps illustrated can be implemented using software stored in the read only memory (ROM) 188 schematically represented in FIG. 10. The power savings routine is entered at the completion of each disk access. A clock monitoring the time since the last disk access is checked and compared with a predetermined amount of time that is associated with each of the two modes. If the comparison indicates that the predetermined amount of time has been exceeded, necessary software instructions and/or hardware signals are generated for controlling the accompanying power savings hardware. In connection with the power savings routine, the microprocessor 144 outputs a command in the form of an address and applies it to an address decoder 192. The output of the address decoder 192 is applied to a power control circuit 194. In the case in which the power control circuit 194 recognizes the address information as being relevant to one of the two power saving modes, the data is received by the power control circuit 194 from the data bus 196 running between the microprocessor 144 and the disk controller 181 and interprets that data for controlling one or both of the two power control switches 200, 202. In the case in which mode one is invoked based on the data received by the power control circuit 194, the power switch 200 is controlled or opened to power down associated circuitry communicating with the power switch 200. In the case of mode two being invoked, the power control circuit 194 recognizes the input thereto as representing a signal to invoke mode two so that the power switch 202 is controlled or opened to remove power from its associated circuitry.

In connection with returning power to circuitry or electronics that has been powered down due to the use of one or both of the power saving modes, under software control, the microprocessor 144 outputs a command in the form of an address identifying the power control circuit 194, which then acts on the data received from the microprocessor 144 to control one or both of the power switches 200, 202.

Figure 12A:
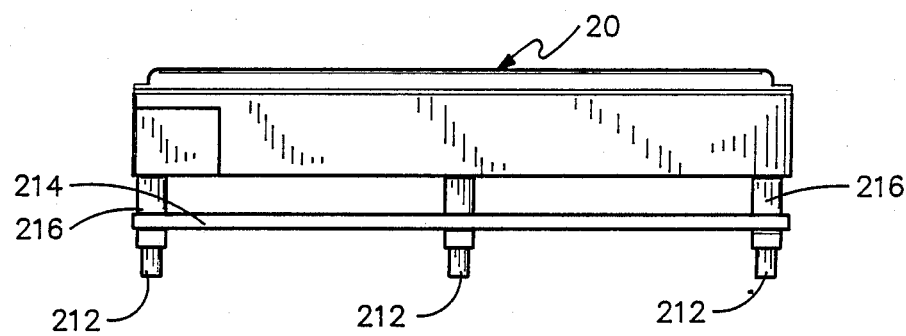
FIGS. 12A-12B illustrate the footprint of the two disk configuration of the present invention.
Figure 12B:
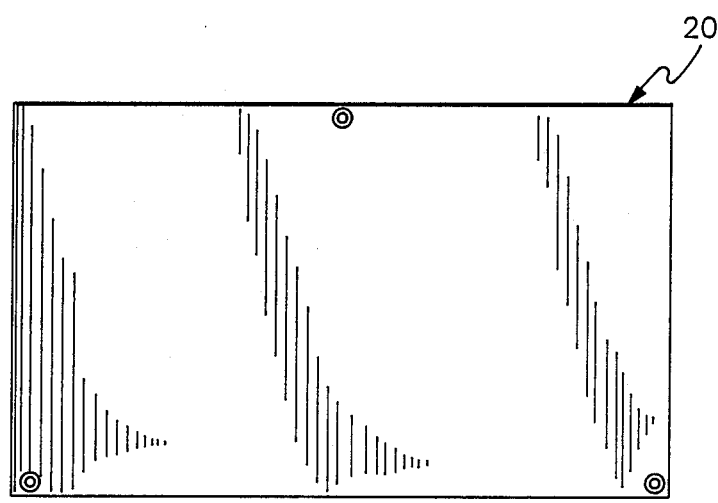

With reference to FIGS. 12A–12B, the compact size of the disk drive apparatus is illustrated. The disks 22, spin motor assembly 24, actuator assembly 26 and ramp assembly 42 are contained in the housing 20. The footprint of the housing 20 includes a length of about 4.3 inches and a width of about 2.8 inches. The height of the housing 20, without attachment mounts 212, is about 1 inch. The weight of the disk drive apparatus is about 0.625 pound. The footprint and weight compare favorably to currently available smaller disk drives. The 3.5 inch disk drive has about three times the volume and three times the weight of the about 2.5 inch disk drive.

Figure 13A:
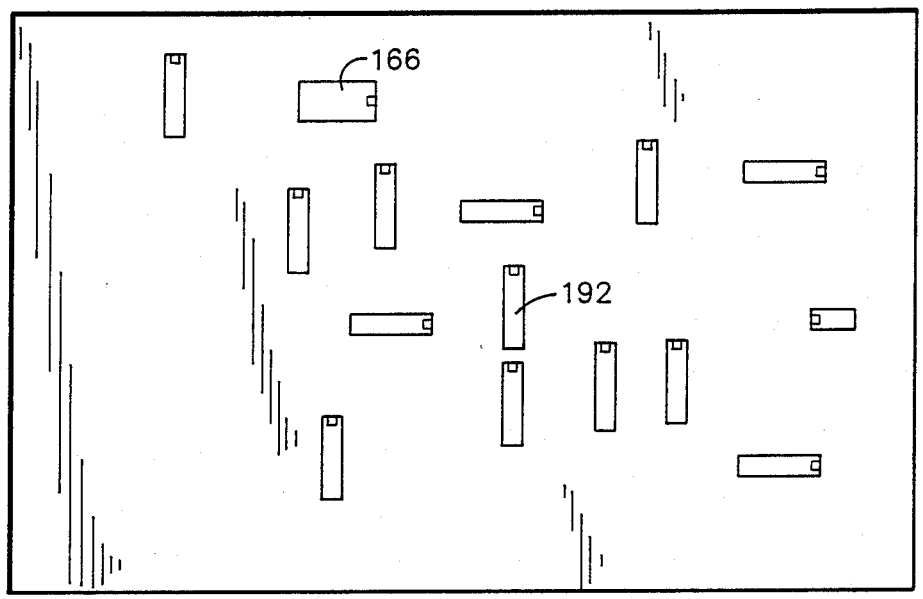
FIGS. 13A-13B illustrate the single printed circuit board on which all of the electronics is disposed including the disk drive circuitry, disk controller and the disk drive intelligent interface electronics.
Figure 13B:
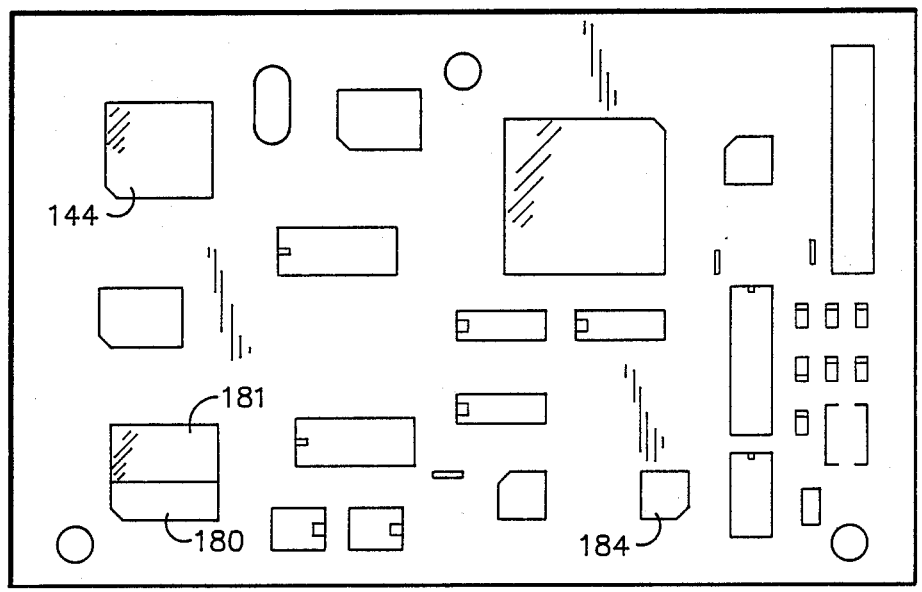

The disk drive electronics, disk controller and the intelligent interface controller are mounted on a single printed circuit board 214, instead of having only the disk drive electronics and disk controller on the single board. The single board 214 is illustrated in FIGS. 13A-13B, with FIG. 13A illustrating the top and FIG. 13B illustrating the bottom thereof. Certain electronic components are noted including the disk drive intelligent interface controller 180 and the disk controller 181. Also contributing to the size and weight reduction is the lack of a printed circuit board mounting frame, which is found on prior art disk drive systems. With reference to FIG. 12A, the board 214 is mounted by itself to the underside of the housing 210 and is desirably spaced therefrom using vibration isolation mounts 216. In the present invention, the board itself acts as its own frame because it has sufficient structural integrity to support on its own all of the necessary disk drive and interface circuitry associated with the about 2.5 inch disk drive apparatus.

Based on the foregoing description, a number of advantages of the present invention are readily identified. A disk drive apparatus is provided for primary use with computer systems such as portable computers and particularly laptop computers. The disk drive apparatus is characterized by its compact size and reduced weight. The rotary ramp-type cam surface loading/unloading assembly contributes to the ruggedness and reliability of the apparatus since it is able to withstand considerable g forces, reduces the likelihood of stiction problems and allows virtually unlimited starts/stops without damage to the disk media. Use of minimal space is optimized by a spin motor design that includes a clamp ring for enhancing the power of the spin motor and providing a more even clamping pressure or force. With the use of a ramp-type cam surface loading, a more powerful actuator is required which leads to the use of a back emf generated signal to determine velocity of the actuator and control its movement during the servo operation. The use of the back emf has the potential to increase the servo bandwidth as it constitutes continuous, not sampled, servo information. A uniquely configured flexible circuit also assists the servo operation by preventing the application of unwanted torques to the actuator during its rotary movement thereby substantially reducing the need for compensating hardware and/or software to overcome this problem. The arrangement of the various disk drive apparatus parts results in a very small footprint associated with the housing of the disk drive apparatus. Consequently, the present invention can be readily used with or fitted to small computer systems, including laptop computers. Because laptop computers are typically powered by a battery, the present invention also incorporates novel power saving techniques which extend battery life and reduce battery drain.

The foregoing discussion of the invention, including any variation of the preferred embodiments, has been presented for purposes of illustration and description. It is not intended that any such embodiment be exhaustive or in any way limit the invention to the precise form disclosed, and other modifications and variations may be possible in light of the above teachings. It is intended that the appended claims be construed to include other alternative embodiments of the invention except insofar as limited by the prior art.

What is claimed is:

1. A disk drive apparatus, comprising:
a hard disk;
actuator means including arm means and motor means, said motor means being operably connected to said arm means for moving said arm means relative to said disk, said motor means for outputting a back emf generated signal;
transducer means connected to said actuator means for reading and writing information on said disk;
electronic means including first means communicating with said motor means for receiving, at substantially the same time, said back emf generated signal and a servo correction signal, said first means detecting and outputting said back emf generated signal for positioning said transducer means relative to said disk, said electronic means for outputting said servo correction signal to said motor means with said outputted servo correction signal being less than about 0.1 ampere;
circuit means connected to said actuator means for transmitting information to and from said transducer means; and
spin motor means operably connected to said disk for rotating said disk.

2. An apparatus, as claimed in claim 1, wherein:
said spin motor means includes a rotor and a clamp ring surrounding an upper portion of said rotor, said clamp ring providing a clamping force for holding said disk.

3. An apparatus, as claimed in claim 2, wherein:
said clamp ring is threaded and engages a circumferential edge of said rotor.

4. An apparatus, as claimed in claim 1, wherein:
said circuit means is flexible and configured to substantially prevent the application of torque to said actuator means by said flexible circuit means.

5. An apparatus, as claimed in claim 4, wherein:
said flexible circuit means includes a first curved portion and a second curved portion, said first curved portion being definable by changing first radius and said second curved portion being definable by a second radius, said actuator means having a pivot and said first curved portion being located farther away from said pivot than said second curved portion when said transducer means is unloaded relative to said disk.

6. An apparatus, as claimed in claim 5, wherein:
said first radius is greater than said second radius.

7. An apparatus, as claimed in claim 6, wherein:
said circuit means includes a member located adjacent to said actuator means and engaging a part of said second curved portion, said member having a surface concentric with portions of a circle defined by said second radius.

8. An apparatus, as claimed in claim 1, wherein:
said actuator means includes a rotary actuator.

9. An apparatus, as claimed in claim 1, wherein:
said arm means includes a suspension arm having a free end, said transducer means being connected adjacent to said free end, said suspension arm including a cam following member fixedly located on said suspension arm inwardly of said transducer means.

10. An apparatus, as claimed in claim 9, wherein:
said suspension arm is generally triangular-shaped and said cam following member is located substantially along a center longitudinal axis of said suspension arm.

11. An apparatus, as claimed in claim 1, wherein: said electronic means includes disk drive electronics, a disk controller and a disk drive intelligent interface controller and said apparatus further includes:

means for conserving power utilized by said disk drive apparatus, said means for conserving power including:

means for monitoring time, means responsive to said means for monitoring time for determining whether the last disk access exceeded a first predetermined amount of time, and means responsive to said means for determining for controlling the powering down of substantially all of said disk drive electronics and said actuator means while maintaining power to said intelligent interface controller and said spin motor means.

12. An apparatus, as claimed in claim 11, wherein: said first predetermined amount of time is programmable.

13. An apparatus, as claimed in claim 11, wherein said means for conserving power further includes:

means for determining whether the last disk access exceeded a second predetermined amount of time; and means for controlling the powering down of said disk drive electronics, said actuator means and said spin motor means while maintaining power to said disk drive intelligent interface controller.

14. An apparatus, as claimed in claim 1 wherein: said single printed circuit board is devoid of a frame.

15. A disk drive apparatus, comprising:

a hard disk having a diameter of about 2.5 inches;

a rotary actuator means including a substantially triangular-shaped arm, an actuator pivot and actuator coil means, said rotary actuator means being pivotal about said actuator pivot and having a center axis being defined substantially through the center of the longitudinal extent of aid arm, through said actuator pivot and through said actuator coil means and in which said rotary actuator means is substantially symmetrical in that substantially equal portions of said arm, said actuator pivot and said actuator coil means are located on opposite sides of said center axis;

means for housing said disk and said rotary actuator means and having a footprint that includes a width of about 2.8 inches;

transducer means connected to said rotary actuator means for reading and writing information on said disk;

circuit means connected to said rotary actuator means for transmitting information to and from said transducer means;

spin motor means operably connected to said disk for rotating said disk, said spin motor means including means for reducing the height thereof while providing a more powerful spin motor means;

electronic means including disk drive electronics for positioning said transducer means relative to said disk, a disk controller and an intelligent interface controller wherein said intelligent interface controller communicates with host computer means; and a single printed circuit board connected to said means for housing in which all of said disk drive electronics, said disk controller and said intelligent interface controller are located on said single printed circuit board and wherein said single printed circuit board is positioned substantially directly aligned with said means for housing, with said single printed circuit board being connected to said means for housing wherein four corners of said means for housing are aligned with four corners of said single printed circuit board, said means for housing and said single printed circuit board together having a height no greater than about one inch.

16. An apparatus, as claimed in claim 15, wherein: said actuator coil means includes a number of coils wound in a substantially triangular configuration and in which said center axis extends through two separate sections of said triangular-configured actuator coil means.

17. A disk drive apparatus, comprising:

a hard disk;

transducer means for reading and writing information on said disk;

actuator means including arm means and motor means and connected to said transducer means, said motor means being operably connected to said arm means for moving said arm means relative to said disk, said actuator means for outputting a back emf generated signal, said arm means including a suspension arm having a free end and being generally triangular-shaped, said transducer means being connected adjacent to said free end, said suspension arm including a cam following member fixedly located along a center longitudinal axis of said suspension arm inwardly of said transducer means, said cam following member including a body part and a tip, said body part converging to said tip, said tip for contacting a cam surface ramp member located adjacent to said disk with said combination body part and tip being substantially cone shaped and said tip having an angle less than the angle of said cam surface ramp member;

electronic means including means communicating with said actuator means for receiving said back emf generated signal to position said transducer means relative to said disk;

circuit means connected to said actuator means for transmitting information to and from said transducer means; and spin motor means operably connected to said disk for rotating said disk.

18. A disk drive apparatus, comprising:

rotary actuator means including actuator arm means having a pivot and actuator motor means;

a hard disk;

transducer means connected to said actuator arm means for reading and writing information on said disk;

electronic means including means communicating with said rotary actuator means for positioning said transducer means relative to said disk;

flexible circuit means connected to said rotary actuator means for providing a signal path to and from said transducer means said flexible circuit means being configured to include a first curved portion and a second curved portion, said first curved portion is defined using a first radius, said second curved portion is defined using a second radius, said first curved portion being farther away from said pivot of said rotary actuator means than is said second curved portion when said transducer means is unloaded relative to said disk, wherein said second radius of said second curved portion defines a circle having a center located substantially at said rotary actuator means pivot and wherein said first radius decreases in magnitude as said transducer means moves from an unloaded position to a loaded position relative to said disk whereby, during substantially the entire movement of said rotary actuator means between loading and unloading said transducer means, substantially zero torque is applied to said rotary actuator means; and spin motor means operably connected to said disk for rotating said disk.

19. An apparatus, as claimed in claim 18, wherein:
said first radius is greater in magnitude than said second radius and further including a member separate and extending outwardly from, but connected adjacent to, said actuator means in which said member has a surface concentric with at least portions of the circle defined by said second radius.

20. An apparatus, as claimed in claim 19, wherein:
said first radius changes during movement of said rotary actuator means.

21. An apparatus, as claimed in claim 18, wherein:
said spin motor means includes a shell for containing parts of said spin motor means and a clamp ring engaging an edge of said shell.

22. An apparatus, as claimed in claim 18, wherein:
said disk has a diameter of about 2.5 inches.

23. An apparatus, as claimed in claim 18, wherein:
said electronic means includes means for detecting a back emf generated signal.

24. An apparatus, as claimed in claim 23, wherein:
said electronic means includes means for generating a signal relating to a desired velocity of said rotary actuator means and wherein said signal is combined with said back emf generated signal.

25. An apparatus, as claimed in claim 18, wherein:
said electronic means includes means for conserving power.

26. A disk drive apparatus, comprising:
rotary actuator means including actuator arm means and actuator motor means;
a hard disk;
transducer means connected to said actuator arm means for reading and writing information on said disk, said actuator arm means including a generally triangular-shaped suspension arm and said transducer means being disposed adjacent a free end of said suspension arm, said actuator arm means further including a cam following member having a conical shape fixedly attached to said suspension arm;
electronic means including means for communicating with said rotary actuator means for positioning said transducer means relative to said disk;
flexible circuit means connected to said rotary actuator means for providing a signal path to and from said transducer means and for causing substantially zero torque to be applied to said rotary actuator means, said flexible circuit means being configured to include a first curved portion and a second curved portion; and
spin motor means operably connected to said disk for rotating said disk.

27. A disk drive apparatus, comprising:
housing means;
a hard disk;
spin motor means for rotating said disk;
transducer means for reading and writing information on said disk, said transducer means including an outer end and an inner end;
electronic means including means for positioning said transducer means relative to said disk;
circuit means for providing a communication path between said transducer means and said electronic means; and
rotary actuator means for dynamically loading said transducer means and including arm assembly means and actuator motor means, said arm assembly means including a substantially triangular-shaped suspension arm having a free end and a longitudinal extent with a mid-portion defined along said longitudinal extent, said transducer means being fixedly disposed adjacent to said free end of said suspension arm, said arm assembly means further including a cam following member disposed entirely between said midportion of said length of said suspension arm and said inner end of said transducer means wherein said cam following member has a length in a direction along said length of said suspension arm less than about ¼ the length of said suspension arm; and
cam surface means fixedly connected to said housing means.

28. An apparatus, as claimed in claim 27, wherein:
said cam following member includes a body portion and a tip and said cam surface means includes an actuator lock, said body portion converging to said tip and said tip being of a size for being received by said actuator lock of said cam surface means.

29. An apparatus, as claimed in claim 27, wherein:
said spin motor means includes a shell for containing motor parts and a clamp ring for engaging a circumferential edge of said shell.

30. An apparatus, as claimed in claim 27, wherein:
said circuit means is connected to said rotary actuator means an is configured to prevent application of a torque to said rotary actuator means.

31. An apparatus, as claimed in claim 27, wherein:
said disk has a diameter of about 2.5 inches.

32. An apparatus, as claimed in claim 27, wherein:
said electronic means includes means for conserving disk drive apparatus power.

33. An apparatus, as claimed in claim 27, wherein:
said electronic means includes disk drive electronics, a disk controller and a disk drive intelligent interface controller and wherein all of said disk drive electronics, said disk controller and said intelligent interface controller are contained on a single printed circuit board.

34. An apparatus, as claimed in claim 27, wherein:
said rotary actuator means includes a support frame and said cam surface means includes a linking member connected to said support frame and wherein said support frame, said rotary actuator means and said cam surface means are joined together to form a single assembly.

35. An disk drive apparatus, comprising:
housing means;
a hard disk;
a spin motor means for rotating said disk;
transducer means for reading and writing information on said disk;
electronic means including means for positioning said transducer means relative to said disk;

circuit means for providing a communication path between said transducer means and said electronic means, rotary actuator means for dynamically loading said transducer means and including arm assembly means and actuator motor means, said arm assembly means including a substantially triangular-shaped suspension arm and a free end, said transducer means being fixedly disposed adjacent to said free end of said suspension arm, said arm assembly means further including a cam following member disposed adjacent to said transducer means but spaced therefrom to avoid interference with said transducer means; and cam surface means fixedly connected to said housing means, said cam following member including a body portion and a tip and said cam surface means including an actuator lock, said body portion converging to said tip and said tip being of a size for being received by said actuator lock of said cam surface means, said combination body portion and tip being substantially cone-shaped and the angle formed by said tip being less than the angle formed by said cam surface means.

36. A disk drive apparatus, comprising:
a hard disk;
spin motor means for rotating said disk;
transducer means for reading and writing information on said disk;
electronic means including means for positioning said transducer means relative to said disk;
circuit means for providing a communication path between said transducer means and said electronic means;
rotary actuator means for dynamically loading/unloading said transducer means and including arm assembly means, an actuator pivot and actuator motor means, said arm assembly means including a substantially triangular-shaped suspension arm having a free end with said arm being rotatable about said actuator pivot, said transducer means being connected adjacent to said free end of said arm;
means for housing said disk and said rotary actuator means; and
a ramp member having an inclined surface with said ramp member being fixedly connected to said means for housing, said ramp member being spaced from said arm but adapted to engage said arm wherein, during loading/unloading of said transducer means, said arm moves along different portions of said inclined surface.

37. A disk drive apparatus, comprising:
housing means;
a hard disk;
spin motor means for rotating said disk;
transducer means for reading and writing information on said disk;
electronic means including means for positioning said transducer means relative to said disk;
circuit means for providing a communication path between said transducer means and said electronic means;
a rotary actuator means for dynamically loading said transducer means and including arm assembly means and actuator motor means, said arm assembly means including a substantially triangular-shaped suspension arm and a free end, said transducer means being fixedly disposed adjacent to said free end of suspension arm, said arm assembly means further including a cam following member disposed adjacent to said transducer means but spaced sufficiently therefrom to avoid interference with said transducer means, said rotary actuator means being supported in said housing means adjacent to at least a first crash stop member, said first crash stop member being fixedly held at a first end portion and supported by a boss at a second end portion; and cam surface means fixedly connected to said housing means.

38. A disk drive apparatus, comprising:
actuator means including arm assembly means and actuator motor means;
a hard disk having an inner diameter and an outer diameter;
transducer means operatively connected to said arm assembly means for reading and writing information on said disk;
circuit means connected to said actuator means for providing a communication path for said transducer means;
electronic means including means for positioning said transducer means relative to said disk;
spin motor means connected to said disk for rotating said disk, said spin motor means including a shell and a clamp ring connected to said shell, said shell being rotatable and containing stator means, said clamp ring extending about a circumferential edge of said shell and outwardly thereof, said clamp ring being used to apply a clamping force for holding said disk in a desired position, said clamp ring having an inner diameter substantially corresponding to said inner diameter of said disk; and
housing means for containing said actuator means, said transducer means, said disk, said circuit means, and said spin motor means.

39. A disk drive apparatus as claimed in claim 38, wherein said clamp ring directly contacts said disk.

40. An apparatus, as claimed in claim 30, wherein:
said actuator means includes rotary actuator means having a cam following member located inwardly of said transducer means;

41. An apparatus, as claimed in claim 58, wherein:
said disk has a diameter of about 2.5 inches and said housing means has a footprint of about 4.3 inches × 2.8 inches.

42. An apparatus, as claimed in claim 38, wherein:
said circuit means is flexible and configured to provide substantially zero torque to said actuator means.

43. An apparatus, as claimed in claim 38, wherein:
said electronic means includes means for detecting a back emf signal generated by said actuator means and means for processing said back emf generated signal to provide a signal relating to velocity of said actuator means.

44. An apparatus, as claimed in claim 38, wherein:
said electronic means includes means for conserving power that is used to power said disk drive apparatus.

45. A disk drive apparatus, comprising:
actuator means including arm means and actuator motor means;
a hard disk;

transducer means connected to said arm assembly means for reading and writing information on said disk;

circuit means connected to said arm assembly means for transmitting information to and from said transducer means;

spin motor means for rotating said disk;

housing means for housing said actuator means, said transducer means, said disk and said spin motor means;

electronic means including means for positioning said transducer means relative to said disk;

first means for monitoring time;

second means for determining whether a first predetermined time has elapsed since a last disk access and for determining whether a second predetermined time, greater than said first predetermined time, has elapsed since a last disk access;

third means for conserving power used by the disk drive apparatus and including means for powering down substantially all of said electronic means, but maintaining power to said spin motor means when said first predetermined time has been exceeded;

fourth means for conserving power used by the disk drive apparatus and including means for powering down at least said spin motor means when said second predetermined time has been exceeded;

fifth means for selecting by an operator at least one of said third and fourth means for conserving power; and sixth means for allowing an operator to select at least one of said first and second predetermined times.

46. An apparatus, as claimed in claim 45, wherein: said disk has a diameter of about 2.5 inches.

47. An apparatus, as claimed in claim 45, wherein: said electronic means includes means for detecting the back electromotive force of said actuator means and using a signal relating to said back electromotive force to provide a signal relating to velocity of said actuator means.

48. An apparatus, as claimed in claim 45, wherein: said circuit means is flexible and configured to substantially eliminate the application of a torque to said actuator means.

49. An apparatus, as claimed in claim 45, wherein: said actuator means is rotary movable and said arm means includes a suspension arm having a cam following member disposed inwardly of said transducer means, said cam following member engaging an actuator lock of cam surface means when said transducer means is unloaded.

50. An apparatus, as claimed in claim 45, wherein: said electronic means includes disk drive electronics, a disk controller and a disk drive intelligent interface controller and wherein said disk drive electronics, said disk controller and said intelligent interface controller are disposed on a single printed circuit board devoid of a frame.

51. An apparatus, as claimed in claim 45, wherein: said spin motor means includes a rotor having a shell and a clamp ring, said clamp ring engaging an outer edge of said shell for use in providing a clamping force to said disk.

52. A disk drive apparatus, comprising:

a hard disk having a diameter of about 2.5 inches;

rotary actuator means including arm means and actuator motor means, said arm means including a substantially triangular-shaped suspension arm and a cam following member fixedly attached to said suspension arm, said cam following member including a body portion and a tip defining a coneshape;

transducer means connected to a free end of said suspension arm for reading and writing information on said disk;

cam surface means positioned adjacent to said disk, said cam surface means including an inclined surface for engaging said cam following member during loading/unloading of said transducer means relative to said disk;

spin motor means for rotating said disk, said spin motor means including motor means and stator means contained within said rotor means, said rotor means including a shell and a clamp ring for engaging a circumferential edge of said shell;

flexible circuit means connected to said rotary actuator means and configured to substantially eliminate any torque applied to said actuator means by said flexible circuit means;

disk drive electronics including a microprocessor and means for positioning said transducer means relative to said disk, said means for positioning including means for detecting the back electromotive force of said actuator means and means for providing a servo correction current signal to said actuator means;

a disk controller communicating with said disk drive electronics;

a disk drive intelligent interface controller communicating with said disk controller for providing an electrical communication path outside of said disk drive apparatus; and means for conserving power including means for controlling the powering down of substantially all of said disk drive electronics while maintaining power to said spin motor means, said disk controller and said disk drive intelligent interface controller.

53. An apparatus, as claimed in claim 52, wherein: said disk drive electronics, said disk controller and said disk drive intelligent interface controller are disposed on a single printed circuit board.

54. An apparatus, as claimed in claim 52, wherein: said cam surface means includes an actuator lock for substantially locking said cam following member when said transducer means is unloaded from said disk.

55. An apparatus, as claimed in claim 53, wherein: said single printed circuit board is devoid of a frame.

* * * * *